(12) United States Patent
Mays et al.

(10) Patent No.: US 9,959,623 B2
(45) Date of Patent: May 1, 2018

(54) DISPLAY OF AN ANNOTATION REPRESENTATION

(71) Applicant: HERE Global B.V., LB Veldhoven (NL)

(72) Inventors: Joseph Mays, Quincy, IL (US); Craig Barnes, Forest Park, IL (US); Desiree N. Sauter, Berlin (DE)

(73) Assignee: HERE Global B.V., Eindhoven (NL)

( * ) Notice: Subject to any disclaimer, the term of this patent is extended or adjusted under 35 U.S.C. 154(b) by 434 days.

(21) Appl. No.: 14/642,632

(22) Filed: Mar. 9, 2015

(65) Prior Publication Data

US 2016/0267067 A1    Sep. 15, 2016

(51) Int. Cl.
| | |
|---|---|
| *G06F 3/048* | (2013.01) |
| *G06T 7/00* | (2017.01) |
| *G06T 11/60* | (2006.01) |
| *G06F 17/30* | (2006.01) |
| *G06T 17/05* | (2011.01) |
| *G06T 19/00* | (2011.01) |

(52) U.S. Cl.
CPC .............. *G06T 7/004* (2013.01); *G06F 17/30* (2013.01); *G06T 11/60* (2013.01); *G06T 17/05* (2013.01); *G06T 19/00* (2013.01); *G06T 2219/004* (2013.01)

(58) Field of Classification Search
CPC ............. G06F 17/241; G06F 17/30011; G06F 17/30038; G06F 17/242; G06F 17/30; G06F 17/05; G06T 7/004; G06T 11/60; G06T 19/00; G06T 2219/004

USPC ........................................................ 715/233
See application file for complete search history.

(56) References Cited

U.S. PATENT DOCUMENTS

| | | | |
|---|---|---|---|
| 8,717,354 B2 | 5/2014 | Zhu et al. | |
| 2009/0179895 A1* | 7/2009 | Zhu | G06F 17/30241 345/424 |
| 2010/0023878 A1* | 1/2010 | Douris | H04L 12/6418 715/757 |
| 2011/0143775 A1 | 6/2011 | Liu et al. | |
| 2011/0173565 A1 | 7/2011 | Ofek et al. | |

(Continued)

FOREIGN PATENT DOCUMENTS

EP    2641166 A2    9/2013

*Primary Examiner* — Scott T Baderman
*Assistant Examiner* — Hassan Mrabi
(74) *Attorney, Agent, or Firm* — Lempia Summerfield Katz LLC

(57) ABSTRACT

A method comprising causing display of a map information representation that represents map information, the map information comprising physical object information that characterizes a physical object, the map information representation comprising a physical object representation that represents the physical object, receiving information indicative of an annotation, generating an association between the physical object information and the annotation, identifying a portion of the physical object representation that is a face representation of the physical object based, at least in part, on the association between the physical object information and the annotation, generating an annotation representation that illustrates the annotation as a texture on a polygon, the polygon corresponding with the face representation, and causing display of the annotation representation in relation to the face representation is disclosed.

16 Claims, 26 Drawing Sheets

(56) References Cited

U.S. PATENT DOCUMENTS

2013/0311868 A1 11/2013 Monney et al.
2014/0032554 A1 1/2014 Constantinou et al.
2014/0313287 A1 10/2014 Qi

* cited by examiner

| Building 500 | Annotation 500A |
|---|---|
| Building 502 | Annotation 502A |
| Building 504 | Annotation 504A |

FIG. 5A

| Building 510 | Face 510A | Annotation 510B |
|---|---|---|
| Building 512 | Face 512A | Annotation 512B |
| Building 514 | Face 514A | Annotation 514B |

FIG. 5B

| Building 520 | Annotation 520A | Offset 520B |
|---|---|---|
| Building 522 | Annotation 522A | Offset 522B |
| Building 524 | Annotation 522B | Offset 522C |

FIG. 5C

| Building 530 | Face 530A | Annotation 530B | Offset 530C |
|---|---|---|---|
| Building 532 | Face 532A | Annotation 532B | Offset 532C |
| Building 534 | Face 534A | Annotation 534B | Offset 532C |

FIG. 5D

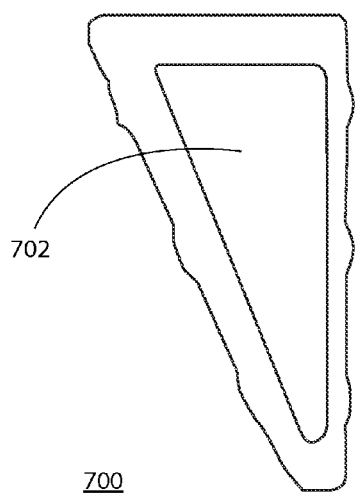
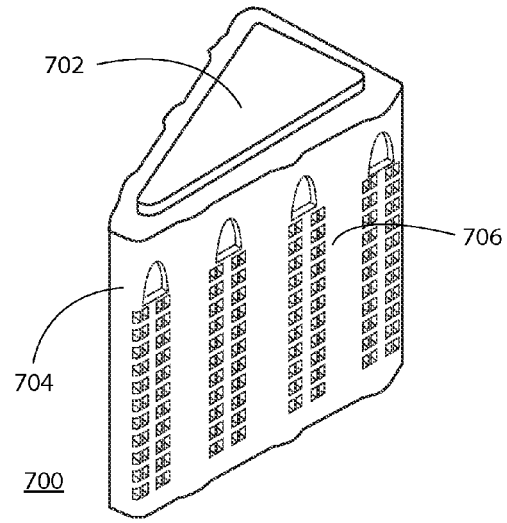
FIG. 7A　　　　　　FIG. 7B
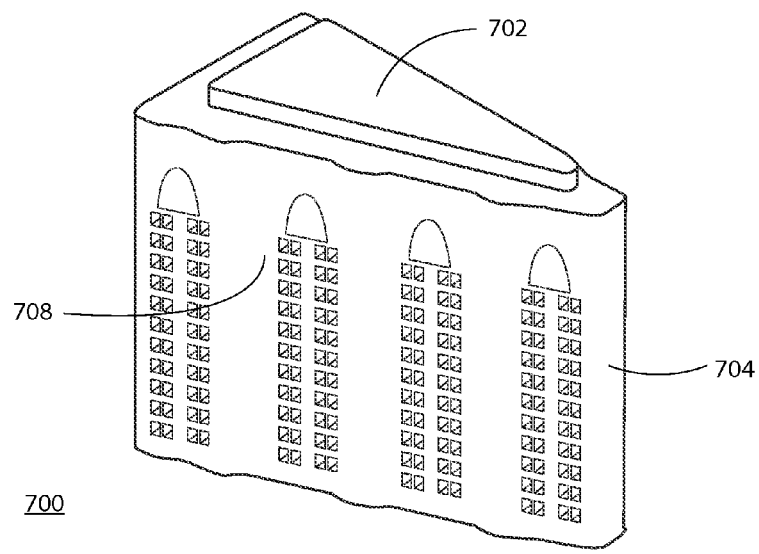
FIG. 7C

DISPLAY OF AN ANNOTATION REPRESENTATION

TECHNICAL FIELD

The present application relates generally to display of an annotation representation.

BACKGROUND

As electronic apparatuses become increasingly prevalent and pervasive in our society, people increasingly utilize electronic apparatuses to view map information. Many users may utilize electronic apparatuses for purposes relating to viewing particular map information. As such, it may be desirable to configure an electronic apparatus such that the electronic apparatus facilitates viewing particular map information in an intuitive and simple manner.

SUMMARY

Various aspects of example embodiments are set out in the summary, the drawings, the detailed description, and the claims.

One or more example embodiments may provide an apparatus, a computer readable medium, a non-transitory computer readable medium, a computer program product, and/or a method for causing display of a map information representation that represents map information, the map information comprising physical object information that characterizes a physical object, the map information representation comprising a physical object representation that represents the physical object, receiving information indicative of an annotation, generating an association between the physical object information and the annotation, identifying a portion of the physical object representation that is a face representation of the physical object based, at least in part, on the association between the physical object information and the annotation, generating an annotation representation that illustrates the annotation as a texture on a polygon, the polygon corresponding with the face representation, and causing display of the annotation representation in relation to the face representation.

One or more example embodiments may provide an apparatus, a computer readable medium, a computer program product, and/or a non-transitory computer readable medium having means for causing display of a map information representation that represents map information, the map information comprising physical object information that characterizes a physical object, the map information representation comprising a physical object representation that represents the physical object, means for receiving information indicative of an annotation, means for generating an association between the physical object information and the annotation, means for identifying a portion of the physical object representation that is a face representation of the physical object based, at least in part, on the association between the physical object information and the annotation, means for generating an annotation representation that illustrates the annotation as a texture on a polygon, the polygon corresponding with the face representation, and means for causing display of the annotation representation in relation to the face representation.

In at least one example embodiment, generation of the association between the physical object information and the annotation comprises receipt of information indicative of an association designation input that signifies the association between the annotation and the physical object, and generation of the association between the physical object information and the annotation based, at least in part, on the information indicative of an association between the annotation and the physical object.

In at least one example embodiment, the annotation representation that illustrates the annotation is generated as a texture on a two-dimensional polygon.

In at least one example embodiment, the map information comprises information that correlates physical objects with location information.

In at least one example embodiment, the map information representation comprises visual information indicative of a plurality of physical objects in relation to the locations of the physical objects.

In at least one example embodiment, the physical object representation comprises visual information indicative of characteristics of the physical object.

In at least one example embodiment, the receipt of information indicative of the annotation comprises receipt of information indicative of a text input; and determination of the annotation to comprise text information indicated by the text input.

In at least one example embodiment, the receipt of information indicative of the annotation comprises receipt of information indicative of a graphical input, and determination of the annotation to comprise graphical information indicated by the graphical input.

In at least one example embodiment, the annotation is distinct from the physical object representation.

In at least one example embodiment, the identification of the portion of the physical object representation that is the face representation of the physical object comprises determination a three-dimensional model of the physical object, identification of an annotation face of the three-dimensional model of the physical object, and identification of the face representation of the physical object to be a portion of the physical object representation that corresponds with the annotation face of the three-dimensional model of the physical object.

One or more example embodiments further perform generation of a two-dimensional image of the annotation.

In at least one example embodiment, the generation of the annotation representation comprises applying the two-dimensional image as a texture to a two-dimensional polygon that corresponds with the annotation face of the three-dimensional model.

In at least one example embodiment, generation of the two-dimensional image of the annotation comprises construction of a set of splines that correspond with the annotation and applying the set of splines to the two-dimensional image.

In at least one example embodiment, the information indicative of the annotation comprises a plurality of stroke inputs and further comprising constructing the set of splines to represent each stroke input of the plurality of stroke inputs.

In at least one example embodiment, the information indicative of the annotation comprises a plurality of stroke inputs and further comprising generation of a textual annotation based, at least in part, on the plurality of stroke inputs.

In at least one example embodiment, the annotation is a two-dimensional image and the generation of the annotation representation comprises applying the two-dimensional image as a texture to a two-dimensional polygon that corresponds with the annotation face of the three-dimensional model.

In at least one example embodiment, causation of display of the annotation representation comprises determination of an annotation position in relation to a position of the annotation face of the three-dimensional model, and causation of display of the annotation representation at the annotation position.

In at least one example embodiment, the annotation position corresponds with the position of the annotation face of the three-dimensional model.

In at least one example embodiment, the causation of display of the annotation representation comprises determination of a geometric normal direction to the annotation face of the three-dimensional model, and rotation of the two-dimensional image to align with the geometric normal direction.

One or more example embodiments further perform receipt of information indicative of an annotation offset.

In at least one example embodiment, the annotation position is offset from the position of the annotation face of the three-dimensional model in correspondence with the annotation offset.

One or more example embodiments further perform receipt of information indicative of an annotation offset input that designates an annotation offset, determination of an offset annotation position that is offset from the position of the annotation face of the three-dimensional model in correspondence with the annotation offset, and causation of display of the annotation representation at the offset annotation position.

One or more example embodiments further perform generation of an association between the physical object information, the annotation, and the annotation offset.

One or more example embodiments further perform causation of transmission to a separate apparatus at least a portion of the physical object information, information indicative of the annotation, information indicative of the association between the physical object information and the annotation, information indicative of the annotation offset, and information indicative of the association between the annotation and the annotation offset.

In at least one example embodiment, the identification of the annotation face of the three-dimensional model comprises identification of a pre-determined face of the three-dimensional model.

One or more example embodiments further perform receipt of information indicative of a face selection input that identifies a selected face of the three-dimensional model, and setting the pre-determined face of the three-dimensional model to correspond with the selected face of the three-dimensional model.

One or more example embodiments further perform retrieving information indicative of the pre-determined face of the three-dimensional model from memory.

In at least one example embodiment, the identification of the annotation face of the three-dimensional model comprises identification of the annotation face to be a viewable face of the three-dimensional model, from a set of viewable faces of the three-dimensional model, that has a geometric normal direction that is most aligned with a view of the three-dimensional model.

In at least one example embodiment, the identification of the annotation face of the three-dimensional model comprises determination of the set of viewable faces of the three-dimensional model.

In at least one example embodiment, the determination of the set of viewable faces of the three-dimensional model comprises generation of a set of faces of the three-dimensional model that excludes internal faces of the three-dimensional model and obscured faces of the three-dimensional model.

In at least one example embodiment, the identification of the annotation face of the three-dimensional model comprises for each viewable face of the set of viewable faces, determination of a view vector for the viewable face from a view position to a centroid of the viewable face, and identification of the annotation face to be a viewable face from the set of viewable faces of the three-dimensional model that has the lowest dot product between the view vector of the viewable face and the geometric normal of the viewable face.

One or more example embodiments further perform receipt of information indicative an object selection input that identifies the physical object representation.

In at least one example embodiment, the generation of the association between the physical object information and the annotation is performed in response to the object selection input.

One or more example embodiments further perform causation of transmission, to a separate apparatus, of at least a portion of the physical object information, information indicative of the annotation, information indicative of the association between the physical object information and the annotation.

One or more example embodiments further perform receipt of information indicative an annotation share input.

In at least one example embodiment, the causation of transmission is performed in response to the annotation share input.

BRIEF DESCRIPTION OF THE DRAWINGS

For a more complete understanding of one or more example embodiments, reference is now made to the following descriptions taken in connection with the accompanying drawings in which:

FIGS. 5A-5D are diagrams illustrating physical object information according to at least one example embodiment;

FIGS. 7A-7F are diagrams illustrating three-dimensional models according to at least one example embodiment;

DETAILED DESCRIPTION OF THE DRAWINGS

Figure 1:
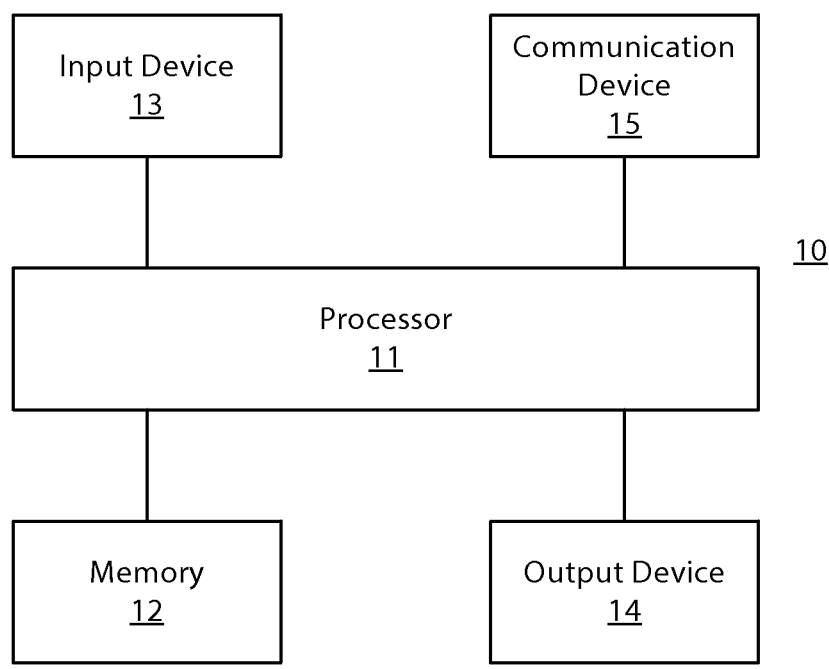
FIG. 1 is a block diagram showing an apparatus according to at least one example embodiment.

Various example embodiments and some of their potential advantages are understood by referring to FIGS. 1 through 17 of the drawings.

Some example embodiments will now further be described hereinafter with reference to the accompanying drawings, in which some, but not all, example embodiments are shown. One or more example embodiments may be embodied in many different forms and the claims should not be construed as being strictly limited to the example embodiments set forth herein; rather, these example embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with one or more example embodiments. Thus, use of any such terms should not be taken to limit the spirit and scope of example embodiments.

Additionally, as used herein, the term 'circuitry' refers to (a) hardware-only circuit implementations (e.g., implementations in analog circuitry, digital circuitry and/or any combination thereof); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that utilize software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit, an applications processor integrated circuit, a cellular network apparatus, other network apparatus, and/or other computing apparatus.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from one or more example embodiments and, therefore, should not be taken to limit the scope of the claims. While electronic apparatus 10 is illustrated and will be hereinafter described for purposes of example, other types of electronic apparatuses may readily employ one or more example embodiments. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, a wearable apparatus, a near eye display, a head mounted display, and augmented reality display, a see through display, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ one or more example embodiments regardless of any intent to provide mobility. In this regard, even though some example embodiments may be described in conjunction with mobile applications, it should be understood that such example embodiments may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises at least one processor, such as processor 11 and at least one memory, such as memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types (e.g., one or more standards in the Institute of Electrical and Electronics Engineers (IEEE) 802 family of wired and wireless standards). By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing one or more example embodiments including, for example, one or more of the functions described herein. For example, processor 11 may comprise means, such as a digital signal processor device, a microprocessor device, an analog to digital converter, a digital to analog converter, processing circuitry and other circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition, or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In example embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display, or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element that is separate from processor 11 for processing data, such as image data. The camera module may provide data, such as image data, in one or more of various formats. In at least one example embodiment, the camera module comprises an encoder, a decoder, and/or the like for compressing and/or decompressing image data. The encoder and/or decoder may encode and/or decode according to a standard format, for example, a Joint Photographic Experts Group (JPEG) standard format.

Figure 2A:
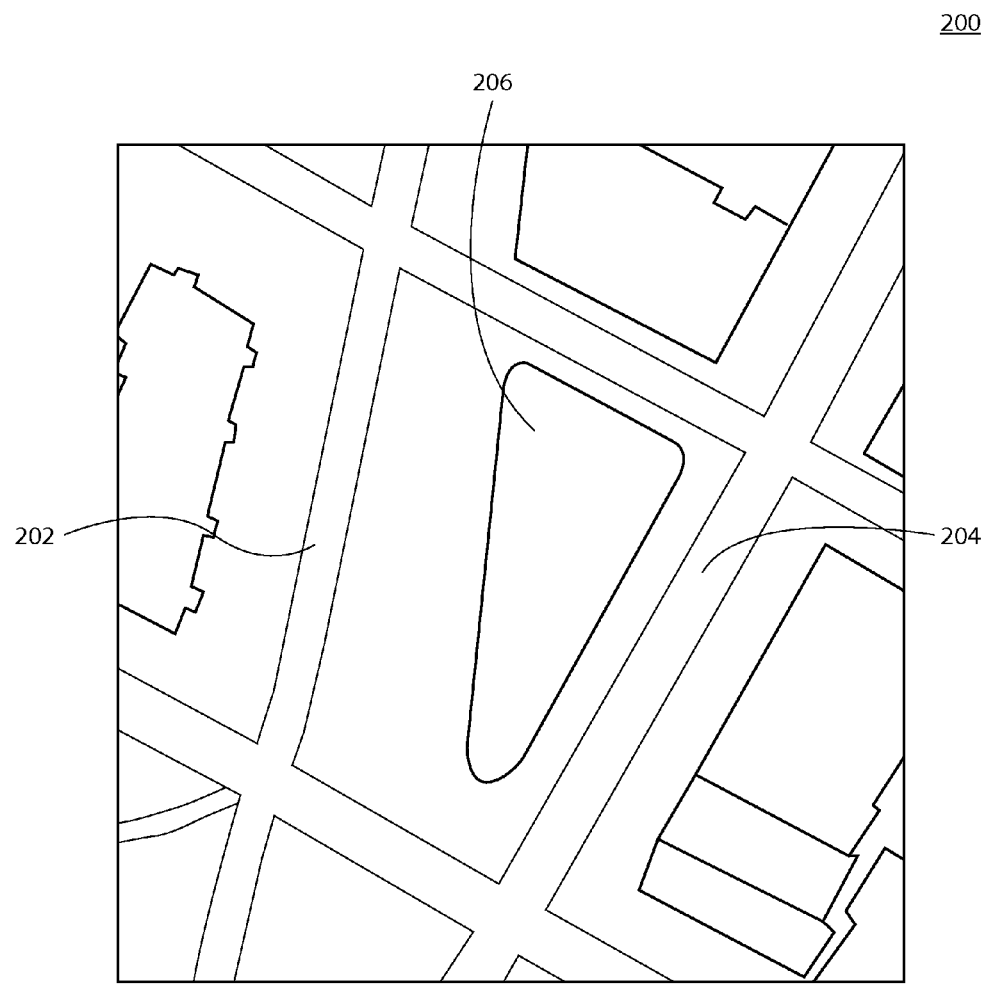
FIGS. 2A-2C are diagrams illustrating map information representations according to at least one example embodiment.
Figure 2B:
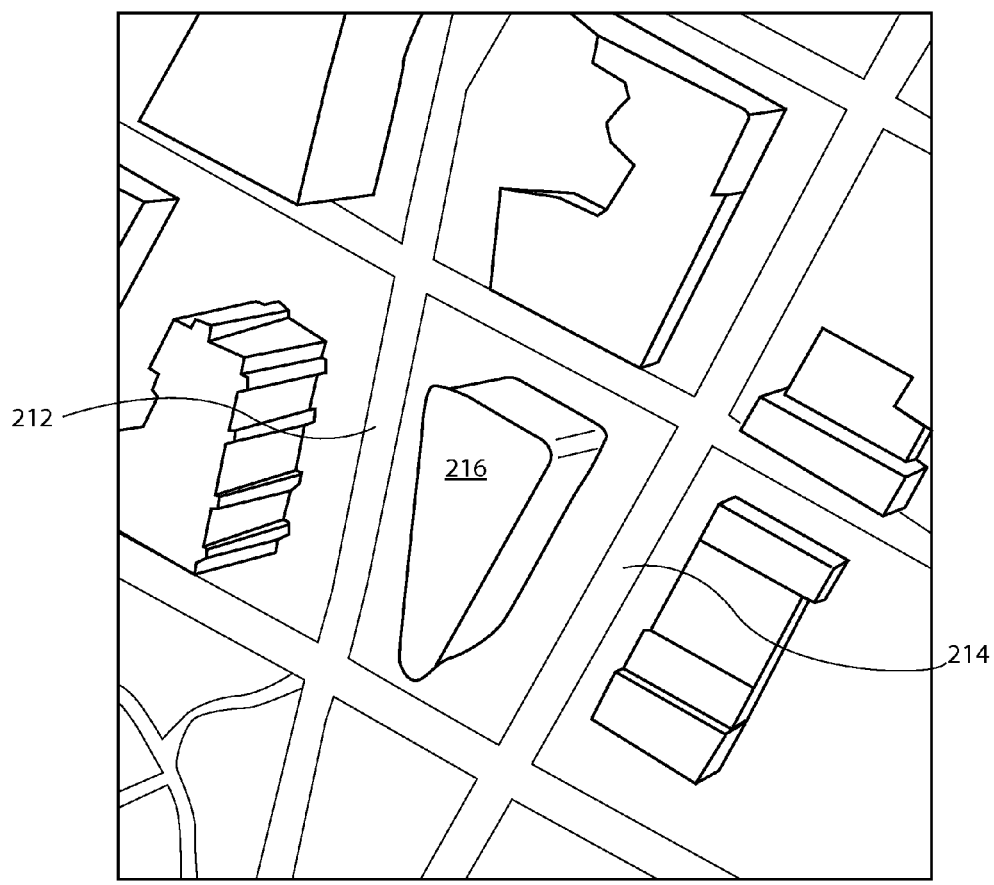
Figure 2C:
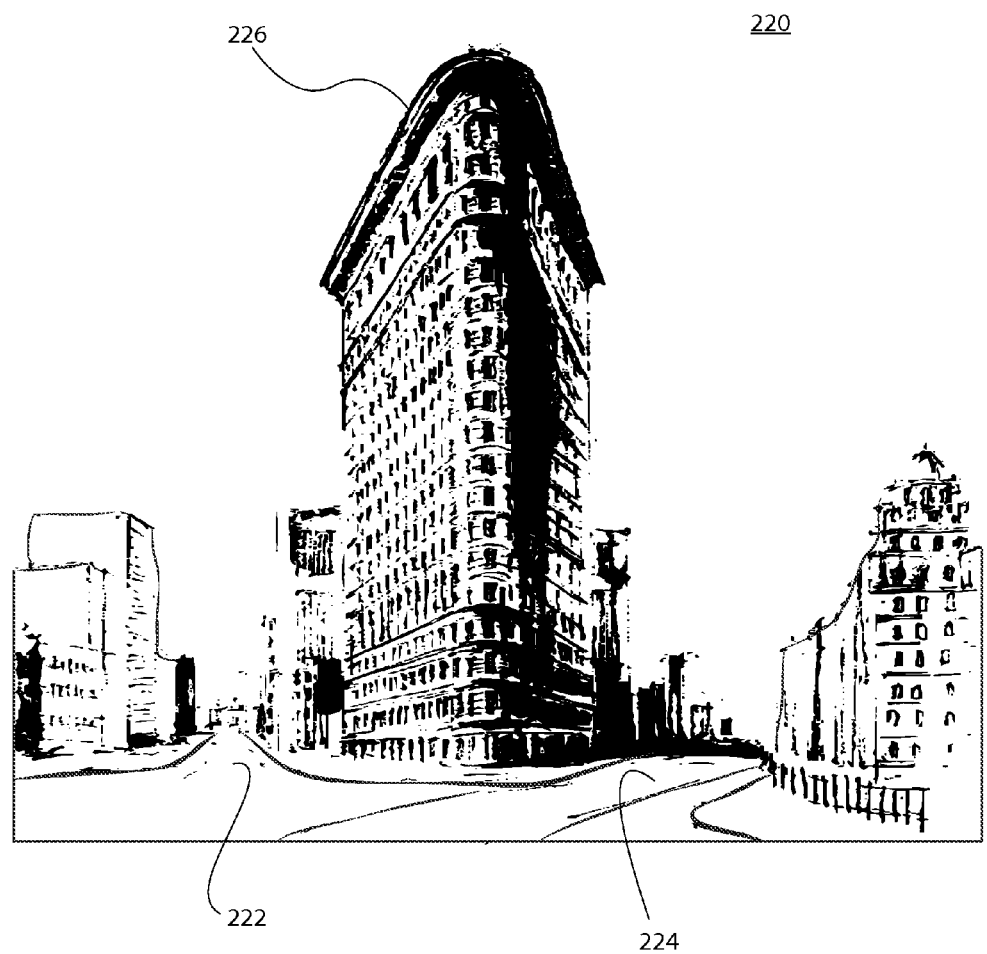

FIGS. 2A-2C are diagrams illustrating map information representations according to at least one example embodiment. The examples of FIGS. 2A-2C are merely examples and do not limit the scope of the claims. For example, the map information may vary, the map information representations may vary, the physical object representations may vary, and/or the like.

In current times, electronic apparatuses are frequently used by users of the electronic apparatuses to view information. For example, a user of an electronic apparatus may utilize an electronic apparatus to view electronic maps. For example, a user of a mobile phone may utilize a navigation application to view an electronic map of an area near the user's current location. In circumstances such as these, the electronic map may display a map information representation. A map information representation may refer to visual information displayed on a display that represents map information. Map information may refer to information representative of a location, one or more cartographic details such as roads, one or more geographical features, one or more political boundaries, one or more labels, one or more cardinal directions, one or more scales, one or more physical objects, and/or the like. For example, map information may comprise a visual representation of a city street layout, with labels for street names, and the borders of the city. In another example, the map information may comprise a floor plan of a large structure, such as an office building, a cruise ship, a stadium, and/or the like.

In some circumstances, map information may comprise physical object information. Physical object information may refer to information that characterizes a physical object. A physical object may be any physical object, such as a building, a road, a landmark, a structure, a vehicle, a natural feature (e.g. a river, a lake, a stream, and/or the like), a man made feature (e.g. a statue, a sculpture, a billboard, and/or the like), and/or the like. Information that characterizes a physical object may be information about the physical object's, name, location, shape, size, appearance, and/or the like similar as described regarding FIGS. 5A-5D.

In some circumstances, map information may comprise information that correlates physical objects with location information. Location information may refer to a location on the earth, a location relative to a physical object, geographical coordinates, a Global Positioning System location, and/or the like similar as described regarding FIGS. 5A-5D. In this manner, a physical object representation may be representative of a location of the physical object in relation to a map information representation. In circumstances such as these, a map information representation may comprise a physical object representation. A physical object representation may refer to visual information displayed on a display that represents a physical object.

The example of FIG. 2A illustrates map information representation 200. Map information representation 200 is representative of a two-dimensional top down view of a location comprised by various buildings and cross streets. It can be seen that map information representation 200 comprises visual information indicative of a plurality of physical objects in relation to the location of the physical objects. For example, it can be seen that map information representation 200 comprises physical object representations 202 and 204, which are representative of roads, and physical object representation 206, which is representative of a building at the location represented by map information representation 200. In this manner, a user viewing map information representation 200 may determine that the building represented by physical object representation 206 is adjacent to the roads represented by physical object representations 202 and 204. It can be seen that physical object representations 202, 204, and 206 comprise visual information indicative of physical characteristics of the roads and building represented by physical object representations 202, 204, and 206. For example, the spatial relationship, the size, the general shape, and the relative locations of the roads and building represented by physical object representations 202, 204, and 206 can be seen.

In some circumstances, a two-dimensional map information representation may obscure details such as the height of physical objects, entrances to buildings, and/or the like. In circumstances such as these, it may be desirable to display a map information representation in three dimensions. The example of FIG. 2B illustrates map information representation 210. Map information representation 210 is representative of a three-dimensional perspective view of a location comprised by various buildings and cross streets. It can be seen that map information representation 210 comprises visual information indicative of a plurality of physical objects in relation to the location of the physical objects. For example, it can be seen that map information representation 210 comprises physical object representations 212 and 214, which are representative of roads, and physical object representation 216, which is representative of a building at the location represented by map information representation 210. In this manner, a user viewing map information representation 210 may determine that the building represented by physical object representation 216 is adjacent to the roads represented by physical object representations 212 and 214. It can be seen that physical object representations 212, 214, and 216 comprise visual information indicative of physical characteristics of the roads and building represented by physical object representations 212, 214, and 216. For example, the spatial relationship, the size, the general shape, and the relative locations of the roads and building represented by physical object representations 212, 214, and 216 can be seen.

In some circumstances, a user of an apparatus may desire to view a photographic representation of a location. For example, a photographic representation may include details that are omitted from a traditional map, may provide clarity in navigating a location for a user that may be visiting the area, and/or the like. For example, a photographic representation of a building may indicate the entrance to the building, a photographic representation of a road may indicate details such as traffic signal and turn lanes, and/or the like. In circumstances such as these, it may be to display for a map information representation to display street level imagery. Street level imagery may refer to photographic information captured from a location. For example, street level imagery may include panoramic photographic images, multiple photographic images combined to form a composite image, 360 degree pannable photographic images, and/or the like, such that a user may view the street level imagery from multiple perspectives. Street level imagery may be combined with other information to form a composite map information representation. For example, a map information representation may combine street level imagery with cartographic details, street names, and/or the like. In this manner, a viewer of the map information representation may view photographic representations of locations.

The example of FIG. 2C illustrates map information representation 220. Map information representation 220 comprises street level imagery of a location comprised by various buildings and cross streets. It can be seen that map information representation 220 comprises visual information indicative of a plurality of physical objects in relation to the location of the physical objects. For example, it can be seen that map information representation 220 comprises physical object representations 222 and 224, which are representative of roads, and physical object representation 226, which is representative of a building at the location represented by map information representation 220. In this manner, a user viewing map information representation 220 may determine that the building represented by physical object representation 226 is adjacent to the roads represented by physical object representations 222 and 224. It can be seen that physical object representations 222, 224, and 226 comprise visual information indicative of physical characteristics of the roads and building represented by physical object representations 222, 224, and 226. For example, the spatial relationship, the size, the general shape, and the relative locations of the roads and building represented by physical object representations 222, 224, and 226 can be seen.

Figures 3A, 3B:
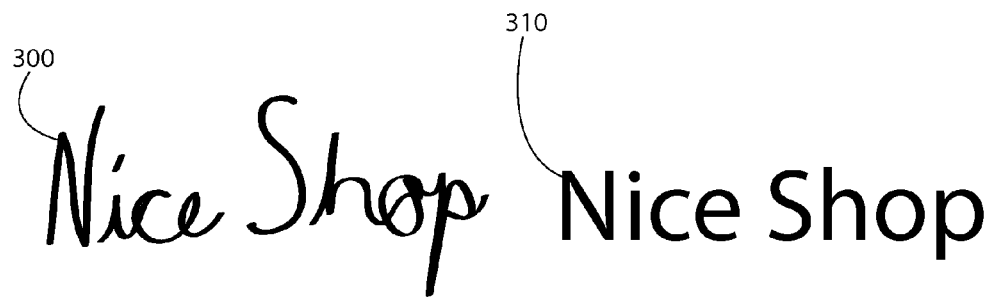
FIGS. 3A-3C are diagrams illustrating annotations according to at least one example embodiment.
Figure 3C:
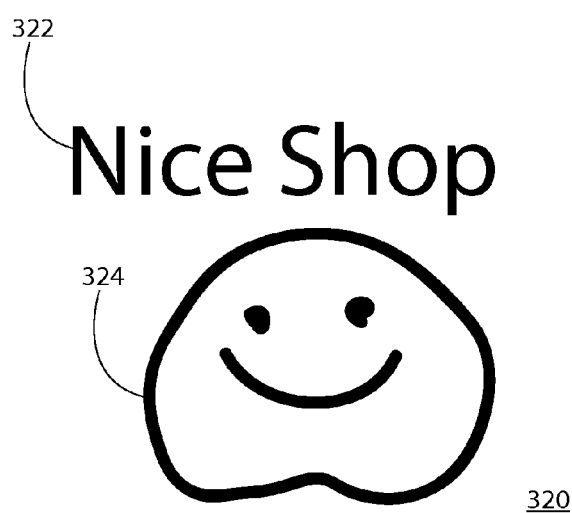

FIGS. 3A-3C are diagrams illustrating annotations according to at least one example embodiment. The examples of FIGS. 3A-3C are merely examples and do not limit the scope of the claims. For example, the annotation may vary, the annotation representation may vary, the text information may vary, and/or the like.

As previously described, a user of an apparatus may view a map information representation on a display. In some circumstances, a viewer of a map information representation may wish to make notes regarding the map information. For example, the viewer may wish to note that a building has a preferred shopping location, a visited restaurant had high quality dining experience, a particular landmark has a pleasant scenic view, and/or the like. In circumstances such as these, it may be desirable for the apparatus to receive, store, edit, retrieve, generate, and/or the like the viewer's notes in the form of an annotation. An annotation may refer to textual information, graphical information, handwriting information, and/or the like related to particular map information.

For example, an annotation may be a text note similar as previously described, a symbol that holds a particular meaning to a user, a code, and/or the like.

As such, in at least one example embodiment, an apparatus receives information indicative of an annotation. For example, the apparatus may receive information indicative of a text input, a touch input, a graphical input, and/or the like indicative of an annotation. For instance, an application on the apparatus may receive a string of text from a keypad, may recognize a text string from handwriting entered by way of a plurality of stroke inputs entered on a touchscreen with a stylus, a finger, and/or the like. In another example, the application may utilize a camera module to capture a string of text by way of optical character recognition, a microphone may be utilized to recognize a pattern of speech from the user's voice by way of speech to text processing, and/or the like. Text entries such as these may be referred to as text input. Text received by way of a text input may be referred to as text information. The application may then determine that the text input, the text information, and/or the like is indicative an annotation. In at least one example embodiment, an apparatus receives information indicative of a text input. In at least one example embodiment, the apparatus determines an annotation to comprise text information indicated by the text input.

As previously described, in some circumstances, an apparatus may receive a stroke input. A stroke input may refer to an input indicative of user handwriting. For example, a user may enter three strokes by way of a stylus on a touchscreen to indicate a capital letter 'A,' may enter a single curving stroke by way of a finger on a touchscreen to indicate a lower case letter 's,' and/or the like. In least one example embodiment, information indicative of an annotation comprises a plurality of stroke inputs. In at least one example embodiment, generation of a textual annotation is based, at least in part, on the plurality of stroke inputs.

As previously described, in some circumstances an apparatus may receive information indicative of a graphical input. A graphical input may refer to an input that generates, selects, captures, and/or the like graphical information. Graphical information may refer to non-textual visual information, such as vector graphics, raster graphics, art, symbols, and/or the like. For example, a graphical input may generate graphical information by way of translating a touch input into a graphical image, a touch input or key press may select a particular symbol from a list, a camera may receive information indicative of a graphical image (for example, a bar code or QR code may designate a particular graphic), and/or the like. In at least one example embodiment, an apparatus receives information indicative of a graphical input. In at least one example embodiment, an apparatus determines an annotation to comprise graphical information indicated by the graphical input.

In circumstances where a user is creating, entering, generating, and/or the like an annotation, it may be desirable for the apparatus to determine when the annotation is complete. For example, if an annotation is long, complex, detailed, and/or the like, it may take more time for the user to enter the annotation than the user would need for a less complex annotation. In circumstances such as these, the user may indicate the annotation is complete by pressing a button, or an algorithm may determine a threshold time has passed (for example, 10 seconds with no additional input) and that the annotation is most likely complete.

Oftentimes when an apparatus has received an annotation, it may be desirable for the apparatus to generate an annotation representation. For example, the user may wish to very that the annotation is correct, may wish to view the annotation at a later time, may wish to forward the annotation to another person for viewing, and/or the like. An annotation representation may refer to visual information displayed on a display that represents an annotation. For example, an annotation representation may be a display of text, graphics, symbols, imagery, and/or the like on a display.

As previously described, in some circumstances, an annotation may be entered by way of a series of stroke inputs. In circumstances such as these, it may be desirable for an annotation representation to represent the series of stroke inputs. For example, the annotation representation may comprise visual information displayed as a set of splines that represent each stroke input of a plurality of stroke inputs. A spline may refer to a function that is piecewise-defined by polynomial functions, and which possess a high degree of smoothness where the polynomial pieces connect. In at least one example embodiment, generation of an annotation comprises construction of a set of splines that correspond with an annotation. In at least one example embodiment, the set of splines are constructed to represent each stroke input of a plurality of stroke inputs.

The example of FIG. 3A illustrates annotation representation 300. It can be seen that annotation representation 300 may be defined by a set of splines. In this manner, each spline of annotation representation 300 may represent a stroke input of a plurality of stroke inputs. For example, a user may enter a string of text by way of a plurality of stroke inputs, and the apparatus may display an annotation representation similar to annotation representation 300.

As previously described, as previously described, in some circumstances, an annotation may be entered by way of a text input. In circumstances such as these, it may be desirable for an annotation representation to represent the text input. For example, the annotation representation may comprise visual information displayed as a string of characters that represent each letter from a text string.

The example of FIG. 3B illustrates annotation representation 310. It can be seen that annotation representation 300 is a string of characters. In this manner, annotation representation 310 may represent a text input. For example, a user may enter a string of characters by way of a text input, and the apparatus may display an annotation representation similar to annotation representation 310. Even though annotation representation 310 is illustrated as a string of text with a particular font in the example of FIG. 3B, it should be understood that an annotation representation may comprise any font, multiple fonts, splines similar as described regarding FIG. 3A, alternative alphabets, and/or the like.

As previously described, as previously described, in some circumstances, an annotation may comprise graphical information. In circumstances such as these, it may be desirable for an annotation representation to represent the graphical information. For example, the annotation representation may comprise visual information displayed as a vector graphic, a series of splines, a raster graphic, and/or the like. In some circumstances, graphical information may further comprise text information.

The example of FIG. 3C illustrates annotation representation 320. It can be seen that annotation representation 320 comprises text information 322 and graphical information 24. For example, a user may enter a graphical input, and the apparatus may display an annotation representation 320. Text information 322 may be similar as described regarding FIGS. 3A-3B. Graphical information 324 may be similar as previously described. It should be understood that graphical information 324 may represent a custom image generated by a user, an image selected by a user, an image captured by a user, and/or the like.

In some circumstances, it may be desirable for an annotation representation to be generated in various manners to illustrate an annotation. For example, it may be desirable for the annotation representation to represent the annotation as a texture on a two-dimensional polygon, as a three-dimensional model, as a deformation of an existing three-dimensional model, as an extrusion, and/or the like. For example, in some circumstances a texture on a two-dimensional polygon may be easier to render. In other circumstances, a three-dimensional model may provide more detail for the annotation representation.

FIGS. 4A-4E are diagrams illustrating annotation representations according to at least one example embodiment. The examples of FIGS. 4A-4E are merely examples and do not limit the scope of the claims. For example, the annotation may vary, the annotation representation may vary, the text information may vary, and/or the like.

As previously described, in some circumstances, an apparatus may cause display of an annotation representation. In some circumstances, it may be desirable to cause display of an annotation representation simultaneous with a physical object representation. For example, the annotation represented by the annotation representation may be associated with the physical object represented by the physical object representation similar as described regarding FIGS. 5A-5D. For instance, the annotation may be a user's notes regarding a building represented by a physical object representation. In circumstances such as these, a user may be able to determine that the physical object and the annotation are associated by viewing the physical object representation simultaneously with the annotation representation, by the proximity between the physical object representation and the annotation representation, based, at least in part, on the annotation representation at least partially overlaying the physical object representation, and/or the like. In at least one example embodiment, an annotation representation is displayed based, at least in part, on an association between a physical object information and an annotation.

Figure 4A:
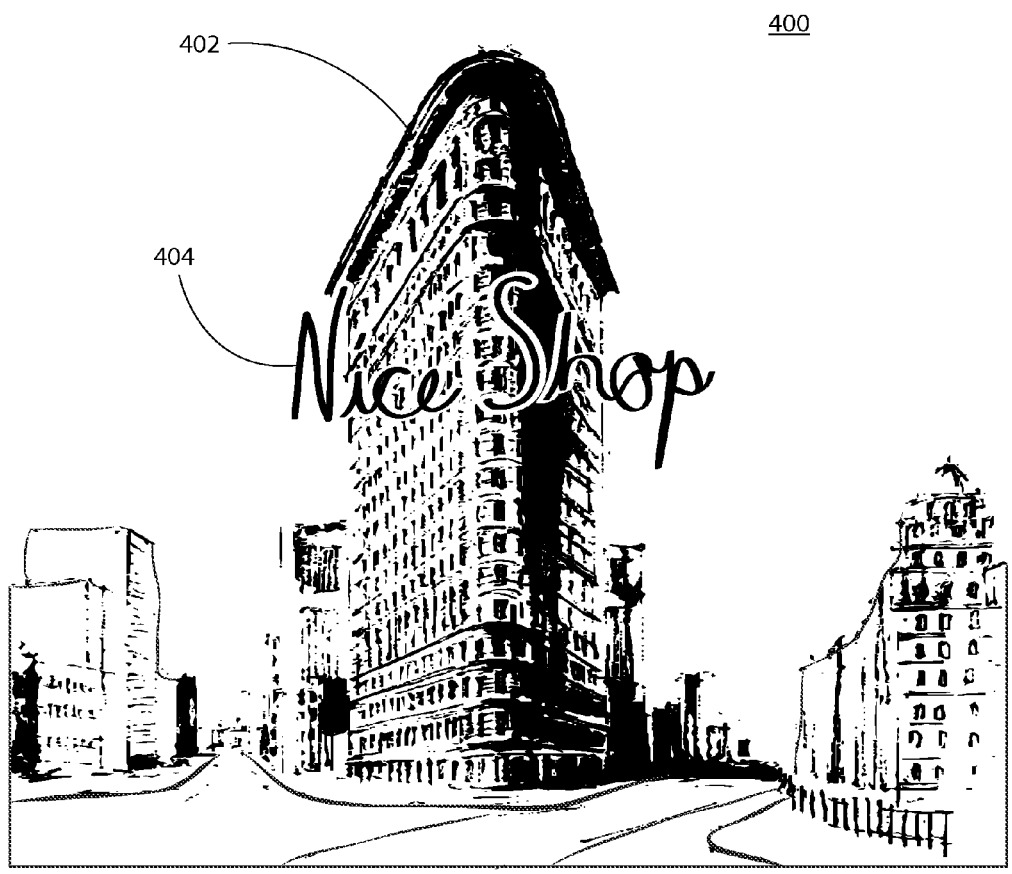
FIGS. 4A-4E are diagrams illustrating annotation representations according to at least one example embodiment.

The example of FIG. 4A illustrates map information representation 400. Map information representation 400 comprises street level imagery of a location comprised by various buildings and cross streets. It can be seen that map information representation 400 comprises physical object representation 402, which is representative of a building at the location represented by map information representation 400, and annotation representation 404. It should be understood that in the example of FIG. 4A, the annotation represented by annotation representation 404 is associated with the building represented by physical object representation 402, similar as described regarding FIGS. 5A-5D. In the example of FIG. 4A, It can be seen that the annotation represented by annotation representation 404 is distinct from physical object representation 402.

In some circumstances, when an annotation representation is displayed, the annotation may not yet be associated with a physical object. In circumstances such as these, a user may desire to associate the annotation with a physical object, similar as described regarding FIGS. 5A-5D. In other circumstances, a user may wish to create a new annotation, and to associate the new annotation with the physical object before the new annotation is created. Such an association may be initiated by way of an object selection input that identifies a physical object representation. For instance, a user may touch a physical object representation on a touch screen to select a physical object, may select the physical object representation with a mouse click, and/or the like. Such a selection may cause association between the physical object represented by the physical object representation and the annotation represented by a displayed annotation representation, may cause association between the physical object represented by the physical object representation and a new annotation to be created at a later time, and/or the like. In at least one example embodiment, an apparatus receives information indicative an object selection input that identifies a physical object representation. In at least one example embodiment, generation of the association between a physical object information and an annotation is performed in response to the object selection input.

In some circumstances, an annotation may be associated with a particular portion of a physical object. For example, if a building comprises multiple tenants, an annotation may be associated with a particular tenant, a particular suite within the building, a business, an address, and/or the like. The tenant may be located on a particular side of a building. In circumstances such as these, it may be desirable to display an annotation representation in a manner where the annotation may be visually associated with a particular portion of a physical object, is displayed in a particular relationship with a physical object representation, and/or the like. For example, an annotation representation may be displayed such that it is superimposed over a particular face representation of a physical object. A face representation may refer to a visual representation of a particular portion of physical object. For example, a face representation may represent a particular outward surface of building (such as a wall, a roof, and/or the like), a surface on a landmark, and/or the like. In at least one example embodiment, an apparatus cause display of an annotation representation in relation to a face representation. In circumstances such as these, the face representation may be referred to as the annotation face.

Figure 4B:
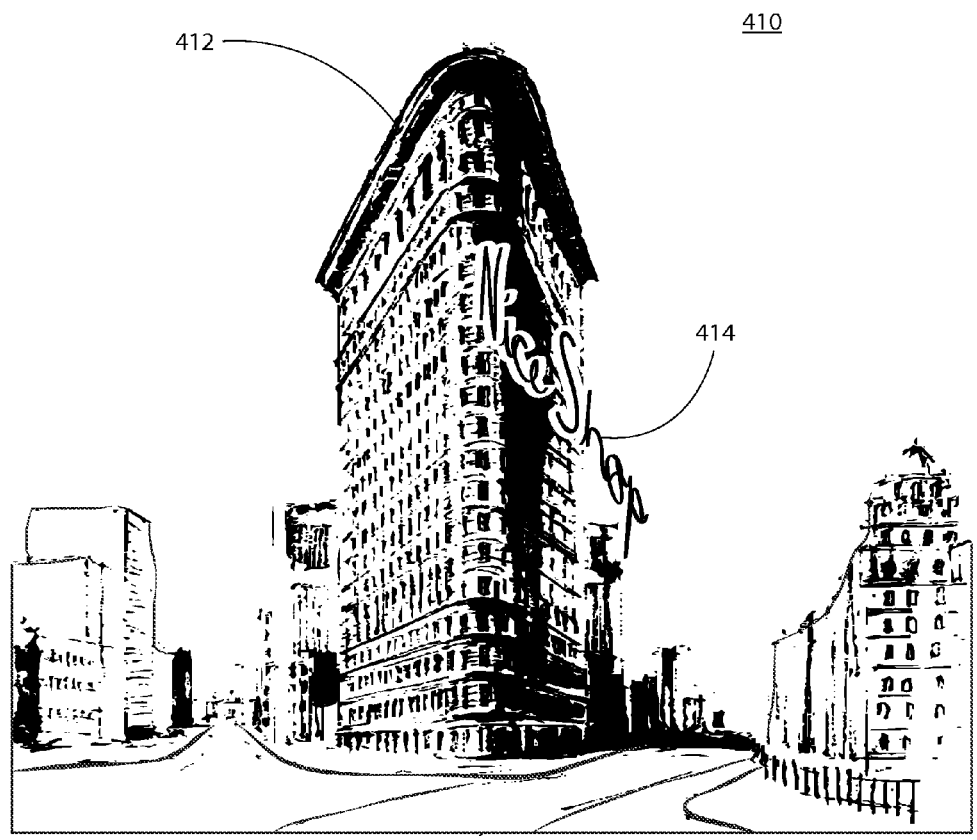

The example of FIG. 4B illustrates map information representation 410. Map information representation 410 comprises street level imagery of a location comprised by various buildings and cross streets. It can be seen that map information representation 410 comprises physical object representation 412, which is representative of a building at the location represented by map information representation 410, and annotation representation 414. It should be understood that in the example of FIG. 4B, the annotation represented by annotation representation 414 is associated with a particular face of the building represented by physical object representation 412, similar as described regarding FIGS. 5A-5D, and that. In the example of FIG. 4B, It can be seen that the annotation represented by annotation representation 414 is displayed superimposed over the right wall face representation of physical object representation 412. In this manner, a viewer of map information representation 410 may determine that the annotation represented by annotation representation 414 is associated with the right wall of the building associated with physical object representation 412.

Figure 4C:
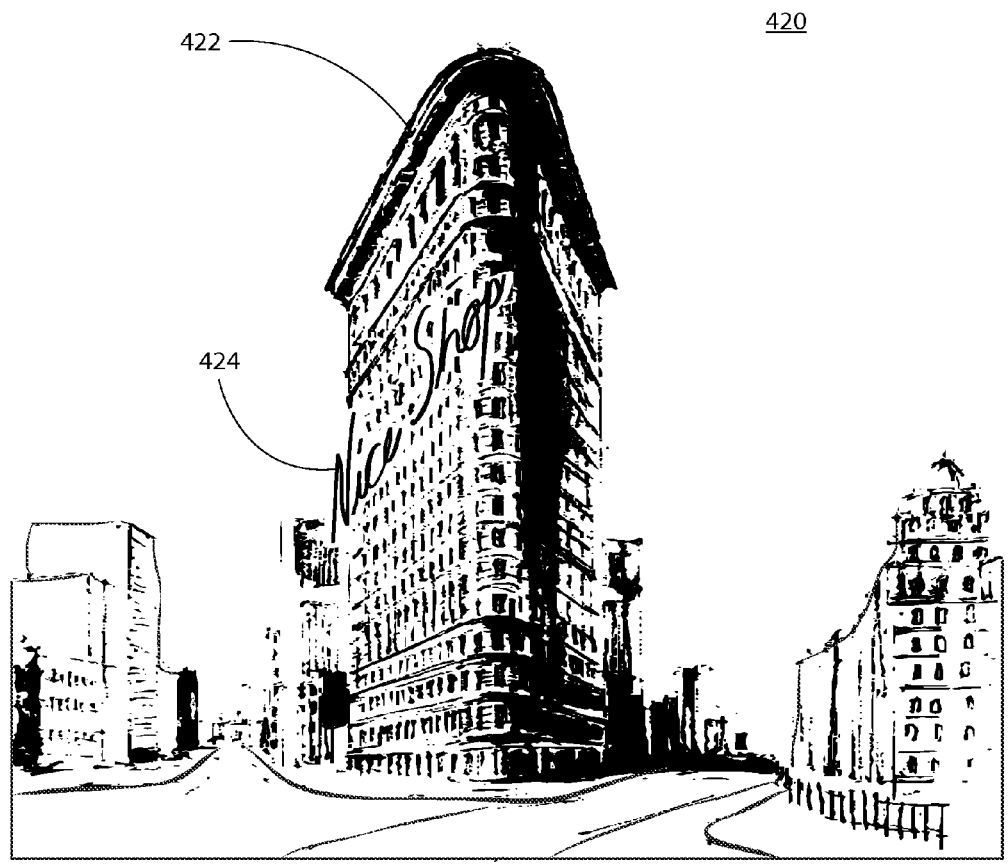

The example of FIG. 4C illustrates map information representation 420. Map information representation 420 comprises street level imagery of a location comprised by various buildings and cross streets. It can be seen that map information representation 420 comprises physical object representation 422, which is representative of a building at the location represented by map information representation 420, and annotation representation 424. It should be understood that in the example of FIG. 4C, the annotation represented by annotation representation 424 is associated with a particular face of the building represented by physical object representation 422, similar as described regarding FIGS. 5A-5D. In the example of FIG. 4C, It can be seen that the annotation represented by annotation representation 424 is displayed superimposed over the right wall face representation of physical object representation 422. In this manner, a viewer of map information representation 420 may determine that the annotation represented by annotation representation 424 is associated with the left wall of the building associated with physical object representation 422.

Figure 4D:

As previously described, in some circumstances, map information may comprise three-dimensional imagery, similar as described regarding FIG. 2B. As discussed previously, in circumstances such as these, it may be to cause display of an annotation representation simultaneous with a physical object representation. The example of FIG. 4D illustrates map information representation 430. Map information representation 430 is representative of a three-dimensional perspective view of a location comprised by various buildings and cross streets. It can be seen that map information representation 430 comprises physical object representation 432, which is representative of a building at the location represented by map information representation 430, and annotation representation 434. It should be understood that in the example of FIG. 4D, the annotation represented by annotation representation 434 is associated with the building represented by physical object representation 432, similar as described regarding FIGS. 5A-5D. In the example of FIG. 4D, It can be seen that the annotation represented by annotation representation 434 is displayed superimposed over physical object representation 432. In this manner, a viewer of map information representation 430 may determine that the annotation represented by annotation representation 434 is associated with the building associated with physical object representation 432.

Figure 4E:
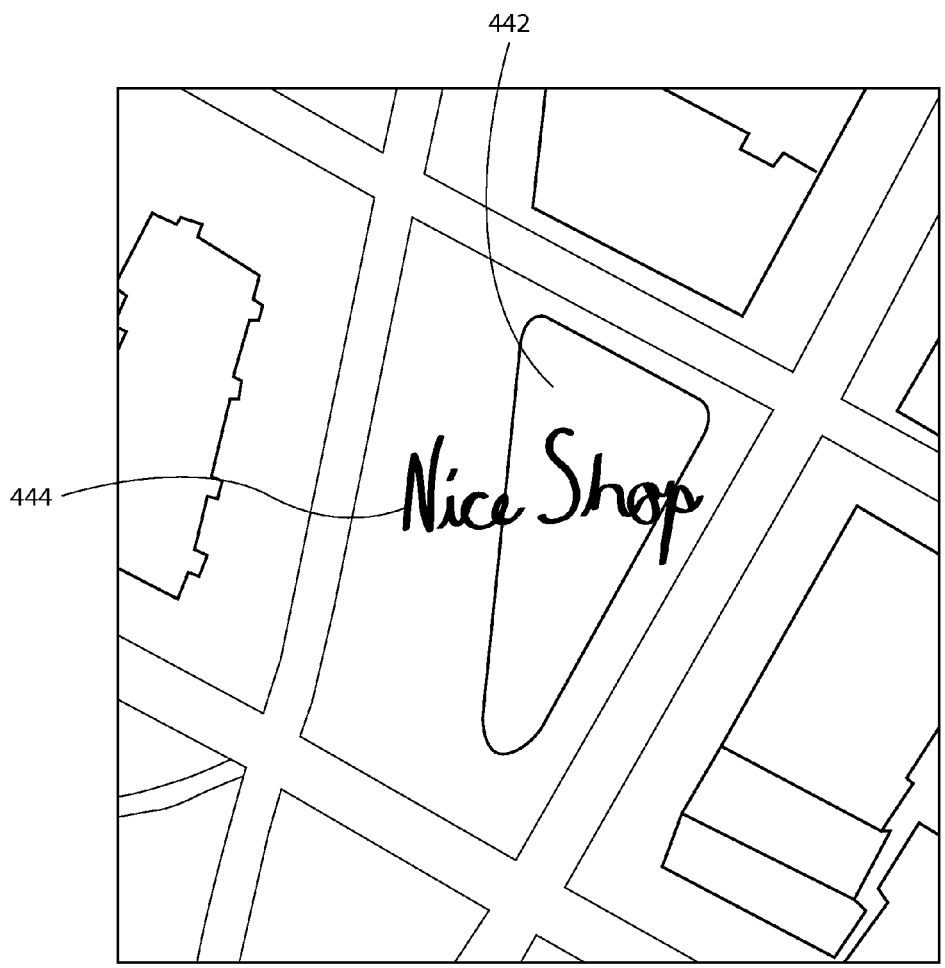

As previously described, in some circumstances, map information may comprise two-dimensional imagery similar as described regarding FIG. 2A. In circumstances such as these, it may be to cause display of an annotation representation simultaneous with a physical object representation similar as previously described. The example of FIG. 4E illustrates map information representation 440. Map information representation 440 is representative of a two-dimensional top down view of a location comprised by various buildings and cross streets. It can be seen that map information representation 440 comprises physical object representation 442, which is representative of a building at the location represented by map information representation 440, and annotation representation 444. It should be understood that in the example of FIG. 4E, the annotation represented by annotation representation 444 is associated with the building represented by physical object representation 442, similar as described regarding FIGS. 5A-5D. In the example of FIG. 4E, It can be seen that the annotation represented by annotation representation 444 is displayed superimposed over physical object representation 442. In this manner, a viewer of map information representation 440 may determine that the annotation represented by annotation representation 444 is associated with the building associated with physical object representation 442.

In some circumstances, it may be desirable for an annotation representation to be displayed in relation to a particular position with respect to a physical object representation. For example, it may be desirable for the physical object representation to be displayed in relation to the centroid of a face representation, displayed in relation to a coordinate system associated with the physical object representation, displayed in relation to a particular corner of a face representation, and/or the like. For instance, display in relation to a particular position may increase readability of the annotation representation, may influence the size the annotation representation is displayed, and/or the like. The display position of an annotation representation may be referred to as an annotation position. In at least one example embodiment, an apparatus determines an annotation position in relation to a position of an object representation. For example, the apparatus may determine that an annotation position is at the centroid of an annotation face. In at least one example embodiment, the apparatus causes display of the annotation representation at the annotation position. For example, if the apparatus has determined that the annotation position is at the centroid of an annotation face, the apparatus may cause display of the annotation representation at the centroid of the annotation face.

In some circumstances a user may no longer wish to view an annotation representation. For example, annotation representations may be cluttering a map information representation, making the map information representation difficult to read. In circumstances such as these, it may be desirable to configure a map information representation such that display of annotation representations may be disabled. Similarly, at a later time, a user may wish to view annotation representations once again. In circumstances such as these, it may be to configure a map information representation such that display of annotation representations may be disabled. In at least one example embodiment, display of annotation representations may be enabled and/or disabled based, it least in part, on information indicative of an annotation display enablement input. An annotation display enablement input may refer to an input that when received enables, disables, displays, hides, and/or the like display of at least one annotation representation. In this manner, a user may control display of annotation representations by way of the annotation display enablement input.

In some circumstances, a user may wish to view a different map information representation. For example, the user may wish to change from a two-dimensional to a three-dimensional representation, may wish to see an alternate three-dimensional view, and/or the like. For example, a user may be viewing a map information representation similar to map information representation 430 of FIG. 4D, and may desire to view a map information representation similar to map information representation 440 of FIG. 4E. The user may indicate such a desired change of map information representation by way of a touch input, a voice input, a tactile input, and/or the like. Such an input may be referred to as a view change input. In at least on example embodiment, an apparatus receives information indicative of a view change input that designates a change of view of the map information represented by the map information representation to a different view of at least part of the map information. For example, the apparatus may receive information indicative of a view change input that designates a change of view from map information representation similar to map information representation 430 of FIG. 4D to a map information representation similar to map information representation 440 of FIG. 4E. In at least one example embodiment, an apparatus causes display of a different map information representation. In such an example, the different map information representation may be representative of the different view of the map information. In such an example, the different map information representation may comprise a different physical object representation that represents the physical object. For example, in response to a view change input, an apparatus may cause display of map information representation similar to map information representation 440 of FIG. 4E in a circumstance where a map information representation similar to map information representation 430 of FIG. 4D was being displayed.

In some circumstances, when a user enters view change input, a map information representation may include an annotation. For example, the map information representation may be similar to map information representation 430 of FIG. 4D. In circumstances such as these, it may be desirable for the annotation representation to be displayed at the same relative position on the different view. For example, if the current view displays the annotation representation at the centroid of an annotation face, it may be desirable for the annotation representation to be displayed at the centroid of the same annotation face in the different view. In at least one example embodiment, in response to a view change input, an apparatus determines an annotation position in relation to a position of the face representation. For example, if a map information representation is being displayed similar to map information representation 430 of FIG. 4D, the apparatus may determine that the annotation position is similar to the position of annotation representation 434 of FIG. 4D. In at least one example embodiment, the apparatus causes display of the annotation representation at the annotation position in relation to a different physical object representation. For example, in response to a view change input, an apparatus may cause display of map information representation similar to map information representation 440 of FIG. 4E in a circumstance where a map information representation similar to map information representation 430 of FIG. 4D was being displayed. In this example, it can be seen that the annotation representation is displayed at approximately the same annotation position.

FIGS. 5A-5D are diagrams illustrating physical object information according to at least one example embodiment. The examples of FIGS. 5A-5D are merely examples and do not limit the scope of the claims. For example, the physical objects may vary, the map information may vary, the annotations may vary, and/or the like.

As previously described, map information may comprise physical object information that characterizes a physical object. Such information may include physical characteristics of the physical object, the location of the physical object, spatial properties of the physical object, and/or the like. For example physical object information may include a location on the earth, a location relative to a physical object, a geographical coordinate, a Global Positioning System location, and/or the like.

In some circumstances, an apparatus may generate an association between the physical object information and other data. For example, the apparatus may generate an association between physical object information and an annotation, similar as described regarding FIGS. 4A-4E. In at least one example embodiment, generation of an association between physical object information and an annotation is based, at least in part, on information indicative of an association between the annotation and the physical object. For example, a user may enter an input that signifies an association between an annotation and a physical object. Such an input may be referred to as an association designation input. In at least one example embodiment, an apparatus receives information indicative of an association designation input that signifies an association between an annotation and a physical object. An association designation input may be entered before the apparatus receives an annotation, after an apparatus receives an annotation, and or the like. For example, a user may enter an association designation input to designate what physical object should be associated with a new annotation, and then the user may enter the new annotation. In another example, the user may enter a new annotation, and then designate a physical object to associate with the annotation.

In circumstances where an association is generated between physical object information and an annotation, it may be desirable to store physical object information and other associated information in a data structure. In this manner, the physical object information associations, such as annotations, may be shared with other apparatuses, users, and/or the like. For example, a physical object may be associated with a particular annotation similar as described regarding FIGS. 4A-4E. In this manner, an apparatus may determine whether an annotation representation may be displayed with relation to an object representation, how the annotation representation should be displayed, and or the like.

FIG. 5A is a diagram showing physical object information and annotation association according to at least one example embodiment. The example of FIG. 5A illustrates an embodiment of a physical object information association data structure. The physical object information association data structure of FIG. 5A comprises information indicative of associations between building 500 and annotation 500A, between building 502 and annotation 502A, and between building 504 and annotation 504A. For example, building 500 may be a particular physical object, and annotation 500A may be a particular annotation associated with building 500. As such, an association between building 500 and annotation 500A has been established and stored in the physical object information association data structure of FIG. 5A. In the example of FIG. 5A, the data structure of FIG. 5A may be stored on a user controlled apparatus, on a server controlled by a map information service provider, and/or the like.

As previously described, in some circumstances an annotation may be associated with a face of a physical object. In circumstances such as these, it may be desirable to store the association in a data structure, similar as described regarding FIG. 5A. FIG. 5B is a diagram showing physical object information and annotation association according to at least one example embodiment. The example of FIG. 5B illustrates an embodiment of a physical object information association data structure. The physical object information association data structure of FIG. 5B comprises information indicative of associations between building 510, face 510A and annotation 510B, between building 512, face 512A, and annotation 512B, and between building 514, face 514A and annotation 514B. For example, building 510 may be a particular physical object, face 510A may be a particular face on building 510 (for example, a wall), and annotation 510B may be a particular annotation associated with face 510A. In this manner, face 510A may be an annotation face for annotation 510B. As such, an association between building 510, face 510A and annotation 510B has been established and stored in the physical object information association data structure of FIG. 5B. In the example of FIG. 5B, the data structure of FIG. 5B may be stored on a user controlled apparatus, on a server controlled by a map information service provider, and/or the like.

Figure 6A:
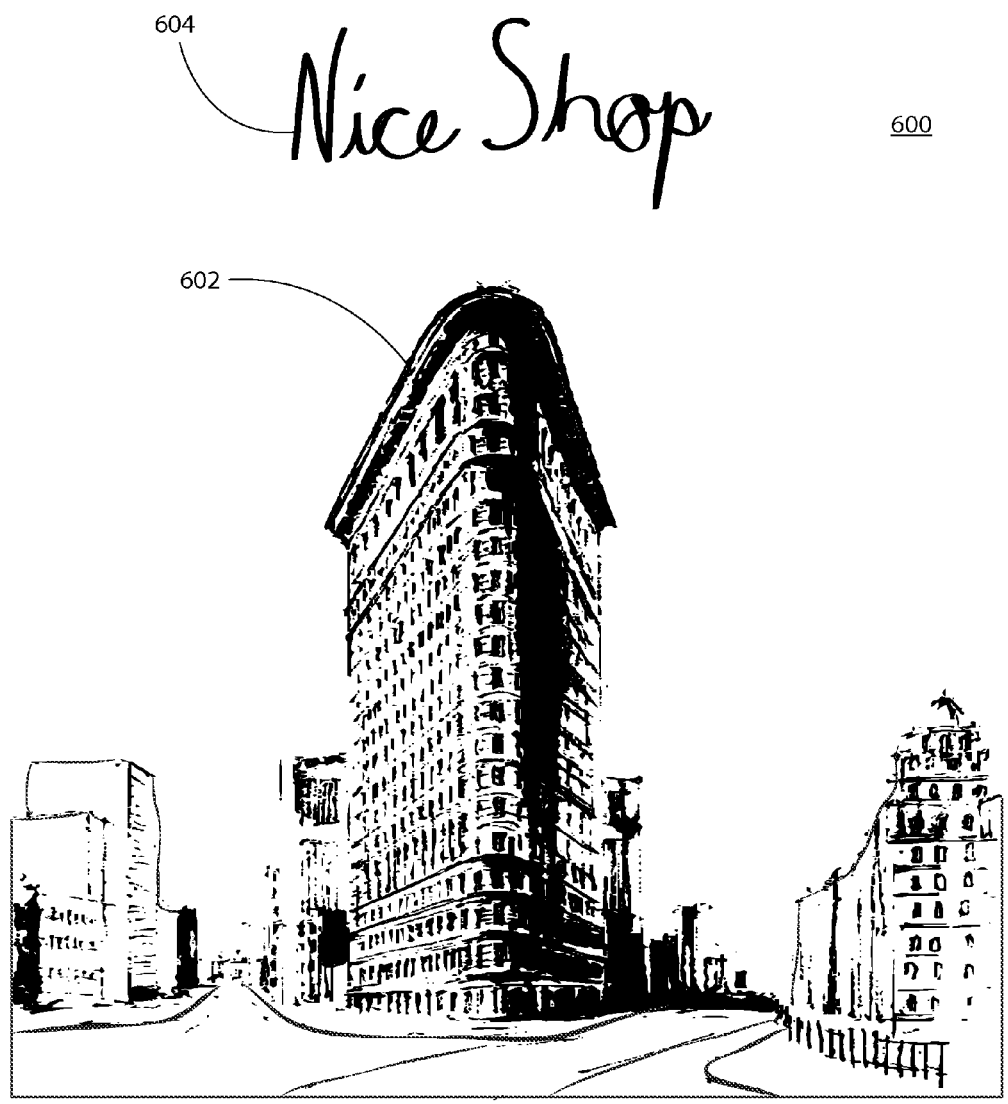
FIGS. 6A-6B are diagrams illustrating annotation offsets according to at least one example embodiment.
Figure 6B:
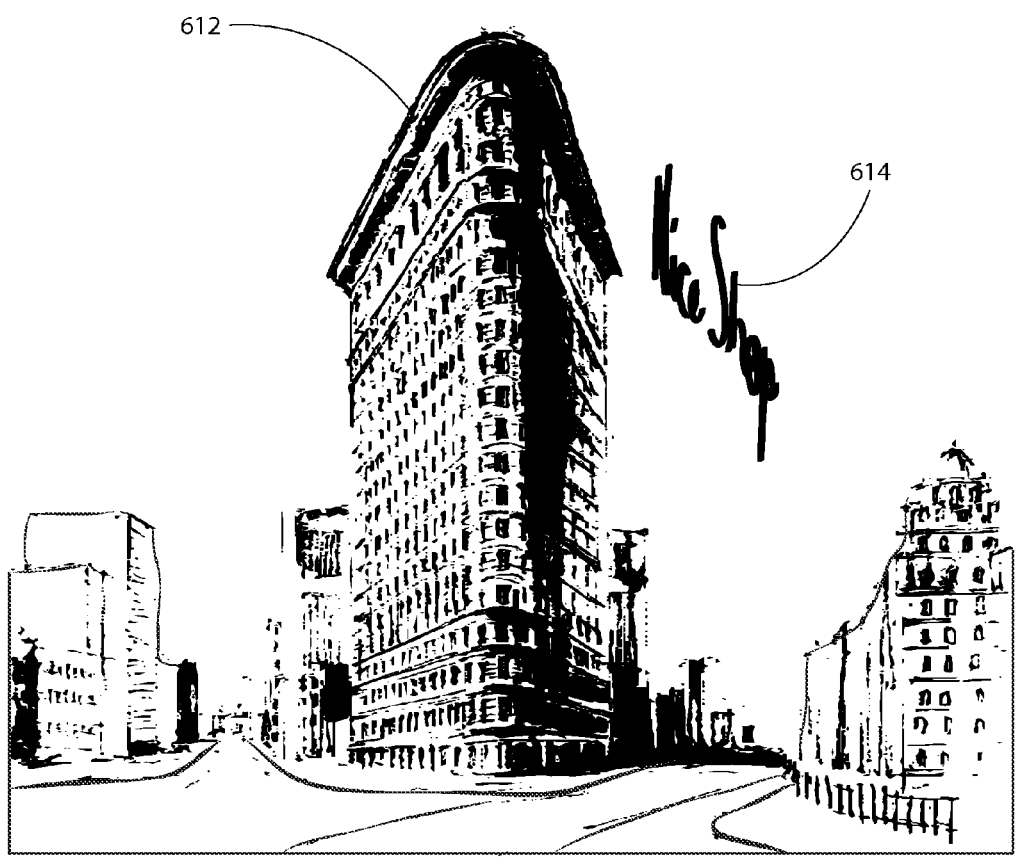

In some circumstances, an apparatus may generate of an association between physical object information, an annotation, and an annotation offset similar as described regarding FIGS. 6A-6B. In circumstances such as these, it may be desirable to store the association in a data structure similar as described regarding FIGS. 5A-5B. FIG. 5C is a diagram showing physical object information and annotation association according to at least one example embodiment. The example of FIG. 5C illustrates an embodiment of a physical object information association data structure. The physical object information association data structure of FIG. 5C comprises information indicative of associations between building 520, annotation 520A, and offset 520B, between building 522, annotation 522A, and offset 522B, and between building 524, annotation 524A, and offset 524B. For example, building 520 may be a particular physical object, annotation 520A may be a particular annotation associated with building 520, and offset 520B may indicate that an annotation representation representing annotation 520A should be displayed offset from a representation of building 520A by a position and distance indicated by offset 520B, similar as described regarding FIGS. 6A-6B. As such, an association between building 520, annotation 520A, and offset 520B has been established and stored in the physical object information association data structure of FIG. 5C. In the example of FIG. 5C, the data structure of FIG. 5C may be stored on a user controlled apparatus, on a server controlled by a map information service provider, and/or the like.

In some circumstances an annotation may be associated with a face similar as described previously, and an annotation offset, similar as described regarding FIGS. 6A-6B. In circumstances such as these, it may be desirable to store the associations in a data structure, similar as described regarding FIGS. 5A-5C. FIG. 5D is a diagram showing physical object information and annotation association according to at least one example embodiment. The example of FIG. 5D illustrates an embodiment of a physical object information association data structure. The physical object information association data structure of FIG. 5D comprises information indicative of associations between building 530, face 530A annotation 530B, and offset 530C, between building 532, face 532A, annotation 532B, and offset 532C, and between building 534, face 534A annotation 534B, and offset 534C. For example, building 530 may be a particular physical object, face 530A may be a particular face on building 530 (for example, a wall), annotation 530B may be a particular annotation associated with face 530A, and offset 530C may indicate that an annotation representation representing annotation 530B should be displayed offset from a face representation of face 530A by a position and distance indicated by offset 530C, similar as described regarding FIGS. 6A-6B. In this manner, face 530A may be an annotation face for annotation 530B. As such, an association between building 530, face 530A, annotation 530B, and offset 530C has been established and stored in the physical object information association data structure of FIG. 5D. In the example of FIG. 5D, the data structure of FIG. 5D may be stored on a user controlled apparatus, on a server controlled by a map information service provider, and/or the like.

FIGS. 6A-6B are diagrams illustrating annotation offsets according to at least one example embodiment. The examples of FIGS. 6A-6B are merely examples and do not limit the scope of the claims. For example, the annotation may vary, the physical object may vary, the annotation offset may vary, and/or the like.

As previously described, in some circumstances an annotation representation may be displayed simultaneously with other representations, such as physical object representations. Similarly, as previously described, annotation representation may be displayed in relation to a particular physical object representation similar as describe regarding FIGS. 4A-4E. In circumstances such as these, the display position of the annotation representation may be less than ideal. For example, the annotation representation may occlude details of a physical object representation that a viewer wishes to see, the annotation representation may be occluded by other map information, such as a different physical object representation that is unassociated with the annotation representation, and/or the like. In circumstances such as these, it may be desirable to offset the display of the annotation representation from an associated physical object representation. The parameters of such a display offset may be referred to as an annotation offset. The display position of an offset annotation representation may be referred to as an offset annotation position.

The parameters of an annotation offset may be highly configurable. For example, an annotation representation may be repositioned around the centroid of a face representation, offset a distance from the face, positioned elsewhere on the face, and/or the like. A centroid may refer to the geometric center of a two-dimensional region, and is the arithmetic mean of all the points within a shape. These offsets are set in the editor application described above. Such offsets may be calculated automatically by an application, entered manually by a user, and/or the like. In at least one example embodiment, an apparatus causes display of an annotation representation at an offset annotation position.

The example of FIG. 6A illustrates map information representation 600. Map information representation 600 comprises street level imagery of a location comprised by various buildings and cross streets. It can be seen that map information representation 600 comprises physical object representation 602, which is representative of a building at the location represented by map information representation 600, and annotation representation 404. It should be understood that in the example of FIG. 6A, the annotation represented by annotation representation 604 is associated with the building represented by physical object representation 602, similar as described regarding FIGS. 5A-5D. In the example of FIG. 6A, It can be seen that the annotation represented by annotation representation 604 is vertically offset from physical object representation 602.

The example of FIG. 6B illustrates map information representation 610. Map information representation 610 comprises street level imagery of a location comprised by various buildings and cross streets. It can be seen that map information representation 610 comprises physical object representation 612, which is representative of a building at the location represented by map information representation 610, and annotation representation 614. It should be understood that in the example of FIG. 6B, the annotation represented by annotation representation 614 is associated with a particular face of the building represented by physical object representation 612, similar as described regarding FIGS. 5A-5D, and that. In the example of FIG. 6B, It can be seen that the annotation represented by annotation representation 614 is offset rightward of the right wall face representation of physical object representation 612.

FIGS. 7A-7F are diagrams illustrating three-dimensional models according to at least one example embodiment. The examples of FIGS. 7A-7F are merely examples and do not limit the scope of the claims. For example, the size of the models may vary, the shape of the models may vary, the location of the models may vary, and/or the like.

As previously described, in some circumstances, a map information representation may comprise street level imagery, similar as described regarding FIG. 2C. Similarly as previously described, it may be desirable to display an annotation representation on the street level imagery, similar as described regarding FIGS. 4A-4E and FIGS. 6A-6B. In some circumstances, when a user is viewing a map information representation, the user may change the viewing perspective of the street level imagery. In circumstances where an annotation representation is displayed simultaneously with the street level imagery, such a change of viewing perspective may make the annotation representation unreadable. For example, the annotation representation may become obscured, text comprised by the annotation representation may become reversed, and/or the like. In circumstances such as these, it may be desirable to automatically position and/or reposition the annotation representation when the viewing perspective is changed such that the annotation representation is viewable.

In other circumstances, a user may be viewing a map information representation comprising three-dimensional imagery. In some circumstances, a user may cause the map information representation to be displayed with two dimensional imagery. Such a change from three-dimensional to two-dimensional imagery may similarly obscure annotation representations. In circumstances such as these, it may be desirable to automatically position and/or reposition an annotation representation when a map information representation is changed such that three-dimensional imagery is replaced with two-dimensional imagery.

When displaying an annotation representation, the following operations may facilitate visibility of the annotation representation from a particular viewing perspective:

1. Generate of an annotation representation that illustrates the annotation as a texture on a polygon.
2. Determine an annotation face (for example, by way of a three dimensional model as described regarding FIGS. 7A-7E, by way of a predetermined annotation face, and/or the like).
3. Associate the annotation representation with the annotation face
4. Position the annotation representation in relation to the position of the annotation face (the annotation position).
5. Rotate the annotation representation to align with the normal direction of the annotation face using a standard technique which computes the rotation needed to align one vector with another.
6. Cause display of the annotation representation at the annotation position.

It should be understood that when viewing two-dimensional map information representations, the preceding operations may position the annotation representation on top of the building, similar as depicted in the example of FIG. 4E. In some circumstances, one or more of the steps of the previously described operations may be omitted, performed in a different order, and/or the like. For example, an annotation representation may have been previously generated, an annotation face may be determined before an annotation is generated, and/or the like. When viewing map information representations comprising three dimensional, street level imagery, and/or the like, the preceding operations may position the annotation representation on the face representation which is most visible in the current viewing perspective angle, and the annotation representation may align with the geometric normal direction of the face representation, similar to the appearance of FIGS. 4B-4C.

From certain viewing perspective angles, an annotation representation may appear to be backwards, have backwards text, and/or the like. In circumstances such as these, the annotation representation may be rotated 180 degrees to increase readability of the annotation representation.

As previously described in the above operations, an annotation representation may be a two-dimensional image of the annotation. In some circumstances, an annotation may comprise a series of stroke inputs indicative of handwriting. In circumstances such as these, generation of the two-dimensional image of the annotation may comprises construction of a set of splines that correspond with the annotation and applying the set of splines to the two-dimensional image. In at least one example embodiment, information indicative of the annotation comprises a plurality of stroke inputs. In at least on example embodiment, generation of the two-dimensional image of the annotation comprises constructing a set of splines to represent each stroke input of the plurality of stroke inputs. In at least one example embodiment, generation of the annotation representation comprises applying the two-dimensional image as a texture to a two-dimensional polygon that corresponds with the annotation face of the three-dimensional model.

In some circumstances, when an apparatus is determining where to position an annotation representation, it may be desirable for the apparatus to determine a three-dimensional model for a physical object. For example, an annotation requiring positioning and/or repositioning may be associated with a particular object similar as described regarding FIGS. 5A-5D, and a three-dimensional model of an object may be utilized by the apparatus to determine an appropriate position to display an annotation representation in relation to a physical object representation. For example, faces of a three-dimensional model may correspond with face representations corresponding with a physical object displayed on a map information representation. The three dimensional model may be utilized to identify a particular face as an annotation face on which to display an annotation representation.

A three-dimensional model may be determined by retrieving a model from a repository of existing three-dimensional models, may be generated from extruded building and/or the convex hull of footprint data, may be retrieved from a map application service provider, and/or the like. In at least one example embodiment, an apparatus determines a three-dimensional model of the physical object. FIGS. 7A-7C illustrate three-dimensional model 700. In the example of FIGS. 7A-7C, model 700 is a model of a physical object, such as an office building. FIG. 7A depicts a top down view of model 700, FIG. 7B depicts a right perspective view of model 700, and FIG. 7 depicts a left perspective view of model 700. It can be seen that in the example FIGS. 7A-7C, model 700 comprises a top face 702, a front face 704, a right side face 706, and a left side face 708.

A three-dimensional model may be viewed from various viewing perspectives after the model is rendered for display. Certain faces of a model may be completely visible, partially visible, partially obscured, completely obscured, and/or the like from certain viewing perspectives. In circumstances such as these, an apparatus may utilize operations to identify the visible faces from a particular viewing perspective, such as the current viewing perspective of the user. Each visible face may potentially serve as an annotation face. In at least one example embodiment, an apparatus determines a set of viewable faces of a three-dimensional model. The determination may be with respect to a particular viewing perspective. The viewable faces may be determined by building an adjacency list for the faces of the model and marking edges which are adjacent to overlapping edges and/or by way of other known techniques.

Figure 7D:
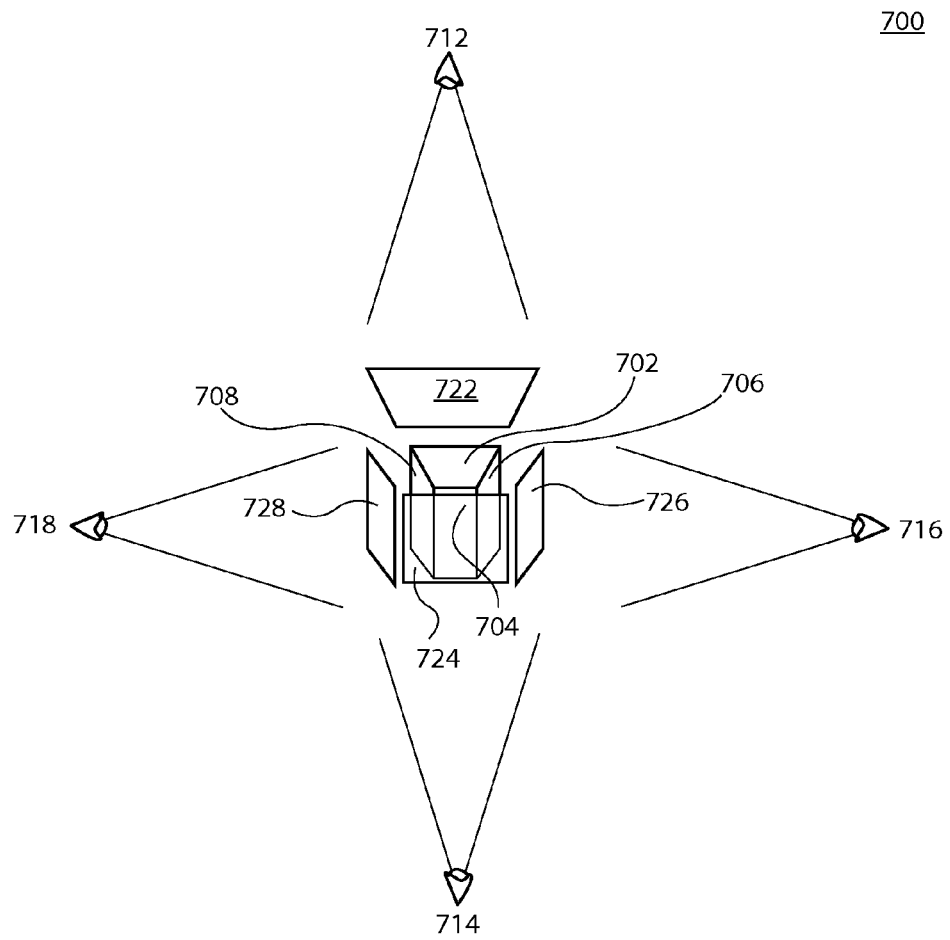

FIG. 7D illustrates a front perspective view of three-dimensional model 700 of FIGS. 7A-7C, and further illustrates viewing perspectives 712, 714, 716, and 718. It should be understood that in the example of FIG. 7D, viewing perspective 712 has a viewing plane approximately equivalent to image plane 722. In this manner, when viewing model 700 from viewing perspective 712, top face 702 may be visible, but front face 704, right side face 706, and left side face 708 may be obscured. It should be understood that in the example of FIG. 7D, viewing perspective 714 has a viewing plane approximately equivalent to image plane 724. In this manner, when viewing model 700 from viewing perspective 714, top face 702 may be obscured, but front face 704, right side face 706, and left side face 708 may be visible. It should be understood that in the example of FIG. 7D, viewing perspective 716 has a viewing plane approximately equivalent to image plane 726. In this manner, when viewing model 700 from viewing perspective 716, right side face 706 and front face 704 may be visible, but left side face 708 and top face 702 may be obscured. It should be understood that in the example of FIG. 7D, viewing perspective 718 has a viewing plane approximately equivalent to image plane 728. In this manner, when viewing model 700 from viewing perspective 718, left side face 708 and front face 704 may be visible, but right side face 706 and top face 702 may be obscured.

When a set of visible faces of a three-dimensional model have been determined, it may be desirable to determine a particular viewable face as an annotation face. For example, the viewable face with a geometric normal direction most aligned with the viewing perspective of the three-dimensional model may be the preferred face for use as an annotation face. When viewing a three-dimensional model form a particular viewing perspective, vectors exist between the centroids of faces of the model and the viewing perspective. These vectors may be referred to as view vectors. View vectors may be utilized to determine which viewable face from the set has a geometric normal direction that is most aligned with the viewing perspective of the three-dimensional model. For example, the viewable face from the set of viewable faces of the three-dimensional model that has the lowest dot product between the view vector of the viewable face and the geometric normal of the viewable face will be the viewable face from the set that has a geometric normal direction most aligned with the viewing perspective of the three-dimensional model. In at least one example embodiment, an apparatus determines a view vector for the viewable face from a view position to a centroid of the viewable face, for each viewable face of the set of viewable faces. In at least one example embodiment, an apparatus determines an annotation face to be a viewable face of the three-dimensional model, from a set of viewable faces of the three-dimensional model, that has a geometric normal direction that is most aligned with a view of the three-dimensional model.

Figure 7E:
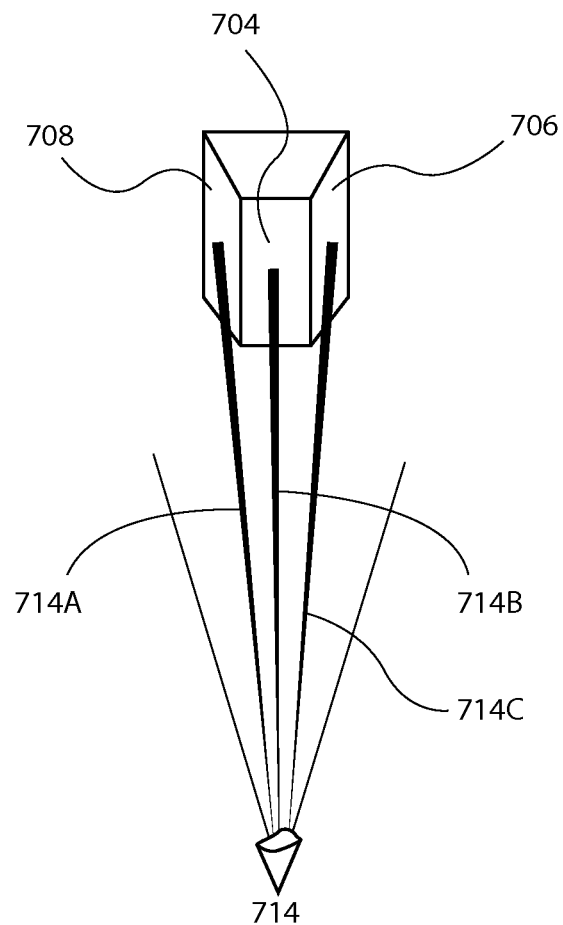

FIG. 7E illustrates a front perspective view of three-dimensional model 700 of FIGS. 7A-7D, and further illustrates viewing perspective 714, similar as described regarding FIG. 7D. Additionally, FIG. 7E illustrates view vectors 714A, 714B, and 714C. It should be understood that in the example of FIG. 7E, view vector 714A is a view vector from viewing perspective 714 to the centroid of left side face 708, view vector 714B is a view vector from viewing perspective 714 to the centroid of front face 704, and view vector 714C is a view vector from viewing perspective 714 to the centroid of right side face 706.

In some circumstances, two face representations may have an identical dot product between the view vector of the viewable face and the geometric normal of the viewable face. In circumstances such as these, one or more alternative selection procedures may be used to select an annotation face from the face representation that have the identical dot product between the view vector of the viewable face and the geometric normal of the viewable face. For example, the apparatus may determine a preferred face representation from a lookup table, may determine a face representation at random, may choose a face representation on a particular side of the physical object (for example right instead of left), may select a face representation that provides for better readability, and/or the like.

When rendering a three-dimensional model of a physical object, it may be desirable for the model rendered to omit certain features of the physical object. For example, omitting certain features that are invisible, or unnecessary may reduce the storage space utilized by the model, may speed up rendering time of physical object representation generated from the model, may simplify view vector calculations between the model and a viewing perspective, and/or the like. For example, rendering of model may omit rendering of interior faces of a building, may simplify contours and/or architectural features, may delete alcoves and/or indentations, and/or the like.

Figure 7F:
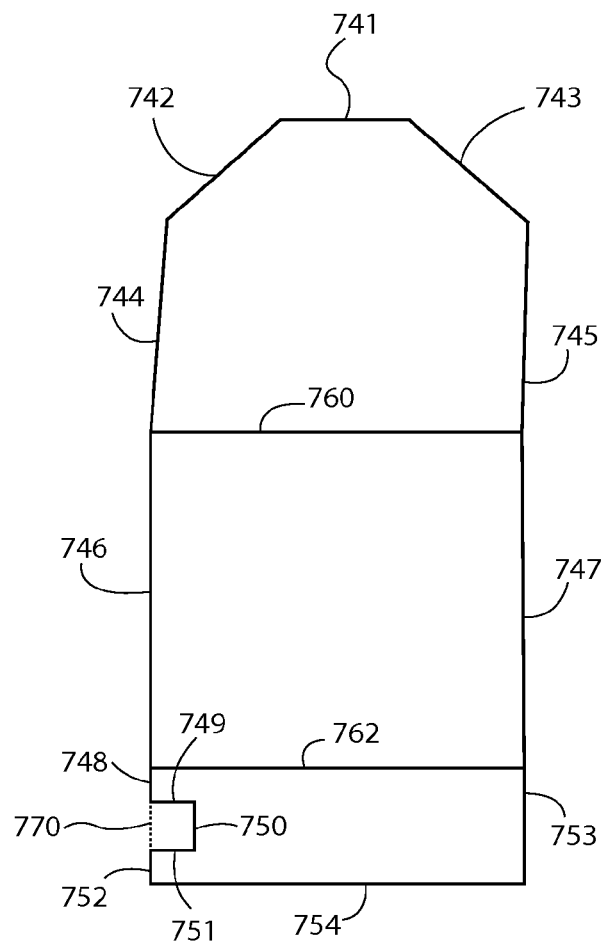

The example of FIG. 7F illustrates a top down view of physical object 740. It can be seen that in the example of FIG. 7F, physical object 740 comprises exterior faces 741-754 and interior faces 760 and 762. In circumstances where a three dimensional model is generated based on physical object 740, the model may omit interior faces 760 and 762. It can be seen that in the example of FIG. 7F, an alcove is created in the space partially surrounded by exterior faces 749-751. In circumstances where a three dimensional model is generated based on physical object 740, the model may replace exterior faces 749-751 with a convex hull corresponding with the location of dashed line 770 on physical object 740.

As previously described, in some circumstances it may be desirable for an annotation to be offset from an annotation face, the annotation face may be associated with an existing offset, and/or the like, similar as described regarding FIGS. 6A-6B. In circumstances where an offset is indicated by an association, the operations previously described should take the offset into account. For example, the apparatus performing the operations may receive information indicative of the annotation offset associated with the annotation face. In circumstances such as these, the apparatus may determine geometric normal direction to the annotation face of the three-dimensional model and determine of an offset annotation position that is offset from the centroid of the annotation face of the three-dimensional model in correspondence with the annotation offset. In this manner, the annotation representation may be displayed at the offset annotation position.

In other circumstances, a user may designate a particular offset by way of an annotation offset input. An annotation offset input may be any input that designates an annotation offset. For example, the input may be a touch input, a gesture, a voice input, a button input, and/or the like. In at least one example embodiment, an apparatus receives information indicative of an annotation offset input that designates an annotation offset. In at least one example embodiment, an apparatus an offset annotation position that is offset from the centroid of the annotation face of the three-dimensional model in correspondence with the annotation offset based, at least in part, on the annotation offset input.

In this manner, the annotation representation may be displayed at the offset annotation position indicated by the annotation offset input.

In some circumstances, an annotation face of a three-dimensional model may be predetermined. For example, physical object information may designate a particular face as an annotation face, a user may have previously selected a desired face, and/or the like. In at least one example embodiment, identification of the annotation face of the three-dimensional model comprises identification of a pre-determined face of the three-dimensional model. In at least one example embodiment, identification of the annotation face of the three-dimensional model comprises retrieving information indicative of the pre-determined face of the three-dimensional model from memory. For example, the apparatus may retrieve information indicative of the predetermined face from a data structure similar as described regarding FIGS. 5A-5D.

As previously described, a user may designate a predetermined face of the three-dimensional model as the annotation face. For example, the user may enter a face selection input. A face selection input may refer to any input that identifies the selected face of the three-dimensional model. For example, the user may touch a particular face representation on a touch screen to identify a selected face. In at least one example embodiment, an apparatus receives information indicative of a face selection input that identifies a selected face of the three-dimensional model. In at least one example embodiment, an apparatus sets the pre-determined face of the three-dimensional model to correspond with the selected face of the three-dimensional model.

Figure 8:
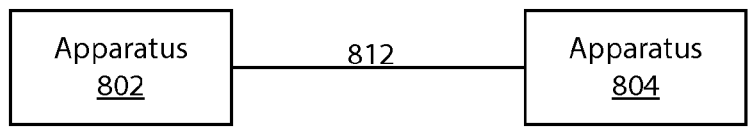
FIG. 8 is a diagram illustrating apparatus communication according to at least one example embodiment.

FIG. 8 is a diagram illustrating apparatus communication according to at least one example embodiment. The example of FIG. 8 is merely an example and does not limit the scope of the claims. For example, apparatus count may vary, apparatus configuration may vary, communication channels may vary, and/or the like.

FIG. 8 is a diagram illustrating apparatus communication according to at least one example embodiment. In the example of FIG. 8, apparatus 802 is an electronic apparatus. An electronic apparatus may be an electronic apparatus that a user commonly utilizes during performance of various tasks, activities, and/or the like. For example, the electronic apparatus may be a near eye apparatus, a pair of shutter glasses, a pair of shutter goggles, a visor apparatus, a Global Positioning System apparatus, a phone, a tablet, a computer, a laptop, and/or the like. In the example of FIG. 8, apparatus 804 is a separate electronic apparatus. A separate electronic apparatus may be an electronic apparatus that a user often utilizes in conjunction with the electronic apparatus, in proximity to the electronic apparatus, and/or the like. For example, a separate electronic apparatus may be a near eye apparatus, a pair of shutter glasses, a pair of shutter goggles, a visor apparatus, a Global Positioning System apparatus, a phone, a tablet, a computer, a laptop, and/or the like. Although the aforementioned example describes apparatus 802 and apparatus 804 as distinct types of apparatuses, namely, an electronic apparatus and a separate electronic apparatus, in some circumstances, the apparatuses may both be electronic apparatuses, both be separate electronic apparatuses, and/or the like.

In the example of FIG. 8, apparatus 802 communicates with apparatus 804 by way of communication channel 812. For example, apparatus 802 may send information to apparatus 804 by way of communication channel 812, apparatus 802 may receive information sent from apparatus 804 by way of communication channel 812, and/or the like. A communication channel, for example, may be a channel utilized for sending and/or receiving of information, data, communications, and/or the like, between two or more apparatuses. It should be understood that, even though the example of FIG. 8 illustrates a direct communication channel between apparatus 802 and apparatus 804, there may be intermediate apparatuses that facilitate communication between apparatus 802 and apparatus 804. For example, there may be one or more routers, hubs, switches, gateways, and/or the like, that are utilized in the communication channels between apparatus 802 and apparatus 804. In addition, there may be other separate apparatuses that apparatus 802 and/or apparatus 804 are in communication with. For example, apparatus 802 and/or apparatus 804 may be in communication with another apparatus, a separate apparatus, a different apparatus, and/or the like.

In some circumstances, a user may desire to have collaboration between apparatuses, such as between an apparatus and a separate apparatus, based on their proximity with each other. For example, it may be intuitive for a user to manage collaboration between apparatuses that are local to each other. A plurality of apparatuses may be proximate to each other based, at least in part, on location, availability of local communication among the apparatuses, and/or the like. For example, if the apparatuses collaborate by way of low power radio frequency communication, a radio frequency communication, near field communication, inductive communication, electric field communication, Bluetooth communication, infrared communication, local area network communication, wireless local area network communication, local port communication, input/output port communication, and/or the like, the apparatuses may be considered to be proximate with each other based, at least in part, on availability of such proximity-based communication with each other. In at least one example embodiment, an apparatus may be a phone, a tablet, a computer, a display, a monitor, a head mounted display, a see through display, a wearable apparatus, a head worn apparatus, a hand worn apparatus, an electronic apparatus, a peripheral apparatus, a host apparatus, and/or the like. In at least one example embodiment, apparatuses communicate with each other. For example, an apparatus may be an apparatus that automatically communicates with another apparatus for purposes such as identifying the apparatus, synchronizing data, exchanging status information, and/or the like. In at least one example embodiment, an apparatus retains information associated with communication with a separate apparatus. For example, the apparatus may comprise information associated with identifying, communicating with, authenticating, performing authentication with, and/or the like, the separate apparatus. In this manner, the apparatus may be privileged to perform operations in conjunction with the separate apparatus that a different apparatus may lack the privilege to perform. For example, the apparatus may be privileged to access specific information that may be stored on the separate apparatus, cause the apparatus to perform one or more operations in response to a directive communicated to the separate apparatus, and/or the like.

In at least one example embodiment, communication based, at least in part, on short range communication is referred to as proximity-based communication. In at least one example embodiment, proximity-based communication relates to wireless communication that is associated with a short range, such as low power radio frequency communication, radio frequency communication, near field communication, inductive communication, electric field communication, Bluetooth communication, infrared communication, local area network communication, wireless local area network communication, local port communication, input/output port communication, and/or the like. In such an example, the exchange of information may be by way of the short range wireless communication between the apparatus and a separate apparatus, host apparatus, and/or the like.

In at least one example embodiment, a proximity-based communication channel is a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like. For example, as depicted in FIG. 8, apparatus 802 communicates with apparatus 804 by way of a communication channel 812. In the example of FIG. 8, communication channel 812 may be a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like.

In at least one example embodiment, an apparatus and a separate apparatus communicate by way of non-proximity-based communication channels. For example, as depicted in FIG. 8, apparatus 802 communicates with apparatus 804 by way of communication channel 812. In the example of FIG. 8, communication channel 812 may be a local area network communication channel, a wide area network communication channel, an internet communication channel, a cellular communication channel, and/or the like.

In some circumstances, a user may wish to share annotations, physical object information, with a user of a separate apparatus, may wish to receive annotations, geometric associations corresponding with an annotation (such as an annotation offset), physical object information, and/or the like from a separate apparatus, and/or the like. For example, a user may wish to receive information from another user about the other user's favorite buildings, shops, restaurants, and/or the like, or may wish to share similar locations with the other user. To facilitate such sharing of information, an apparatus may transmit and or receive a portion of physical object information, information indicative of an annotation, information indicative of an association between physical object information and an annotation, information indicative of an annotation offset, information indicative of an association between an annotation and an annotation offset, and/or the like. The information may be used to display annotations on an apparatus similar as described regarding FIGS. 3A-C, FIGS. 4A-4E, FIGS. 5A-5D, FIGS. 6A-6B, and FIGS. 7A-7F. In at least one example embodiment, an apparatus causes transmission to a separate apparatus at least one of a portion of physical object information, information indicative of an annotation, information indicative of an association between physical object information and an annotation, information indicative of an annotation offset, and/or information indicative of an association between an annotation and an annotation offset. For example, an apparatus may transmit information indicative of an annotation to a separate apparatus. In such an example, the separate apparatus may utilize the information to display an annotation representation. In at least one example embodiment, an apparatus receives from a separate apparatus at least one of a portion of physical object information, information indicative of an annotation, information indicative of an association between physical object information and an annotation, information indicative of an annotation offset, and/or information indicative of an association between an annotation and an annotation offset. For example, an apparatus may receive information indicative of an annotation to a separate apparatus. The apparatus may utilize the information to display an annotation representation.

In circumstances where a user wishes to share annotations with another user, the user may wish to initiate sharing the annotation by way of an input. For example, the user may use a touch input, a voice input, a button input, and/or the like to initiate a sharing of an annotation. Such an input may be referred to an annotation share input. In at least one example embodiment, an apparatus receives information indicative an annotation share input. In at least one example embodiment, transmission of at least one of a portion of physical object information, information indicative of an annotation, information indicative of an association between physical object information and an annotation, information indicative of an annotation offset, and/or information indicative of an association between an annotation and an annotation offset is performed in response to the annotation share input.

Figure 9:
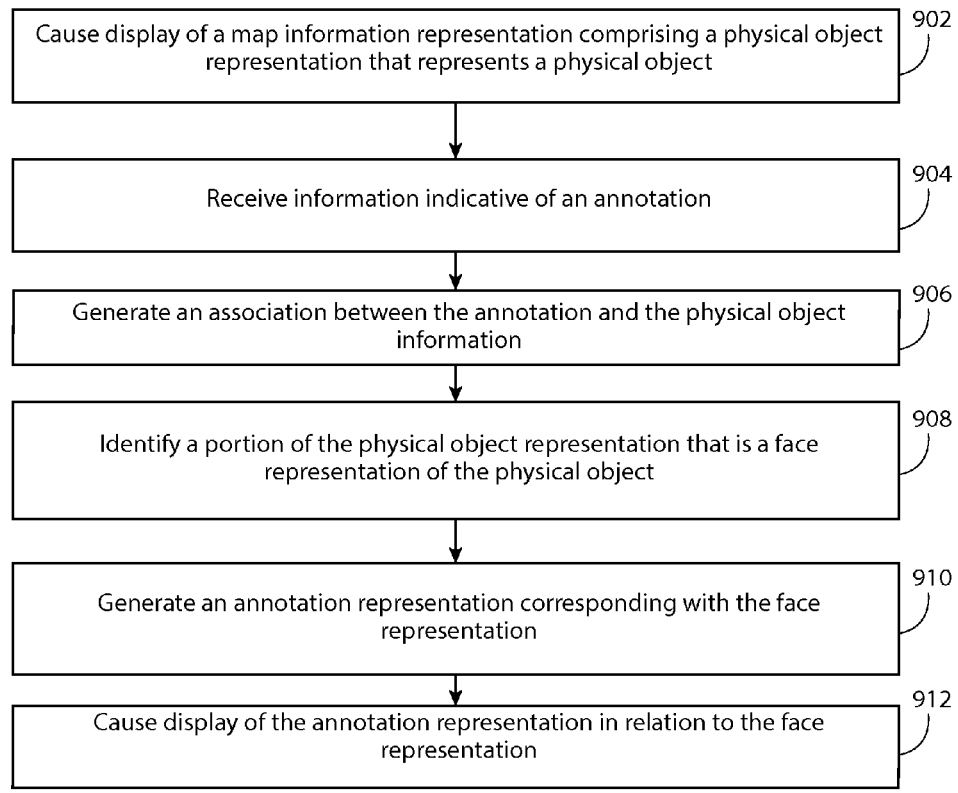
FIG. 9 is a flow diagram illustrating activities associated with display of an annotation representation according to at least one example embodiment.

FIG. 9 is a flow diagram illustrating activities associated with display of an annotation representation according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As previously described, in some circumstances an apparatus may display an annotation representation.

At block 902, the apparatus causes display of a map information representation. The map information representation represents map information comprising physical object information that characterizes a physical object. The map information representation comprises a physical object representation that represents the physical object. The display, the map information representation, the map information, the physical object information, the physical object, and the physical object representation may be similar as described regarding FIG. 1, FIGS. 2A-2C, FIGS. 4A-4E, FIGS. 5A-5D, FIGS. 6A-6B, and FIGS. 7A-7F.

At block 904, the apparatus receives information indicative of an annotation. The receipt and the annotation may be similar as described regarding FIG. 1, FIGS. 3A-3C, FIGS. 4A-4E, FIGS. 5A-5D, FIGS. 6A-6B, FIGS. 7A-7F, and 8.

At block 906, the apparatus generates an association between the physical object information and the annotation. The generation and the association may be similar as described regarding FIG. 1, FIGS. 2A-2C, FIGS. 3A-3C, FIG. 4A-4E, FIG. 5A-5D, FIGS. 6A-6B, FIGS. 7A-7F, and FIG. 8.

At block 908, the apparatus identifies a portion of the physical object representation that is a face representation of the physical object. The identification may be based, at least in part, on the association between the physical object information and the annotation. The identification and the face representation may be similar as described regarding FIG. 1, FIGS. 2A-2C, FIGS. 3A-3C, FIGS. 4A-4E, FIGS. 5A-5D, FIGS. 6A-6B, FIGS. 7A-7F, and FIG. 8.

At block 910, the apparatus generates an annotation representation that corresponds with the face representation. The generation and the annotation representation may be similar as described regarding FIGS. 3A-3C, FIGS. 4A-4E, FIGS. 5A-5D, FIGS. 6A-6B, FIGS. 7A-7F, and FIG. 8.

At block 912, the apparatus causes display of the annotation representation in relation to the face representation. The display may be similar as described regarding FIG. 1, FIGS. 3A-3C, FIGS. 4A-4E, FIGS. 6A-6B, and FIGS. 7A-7F.

Figure 10:
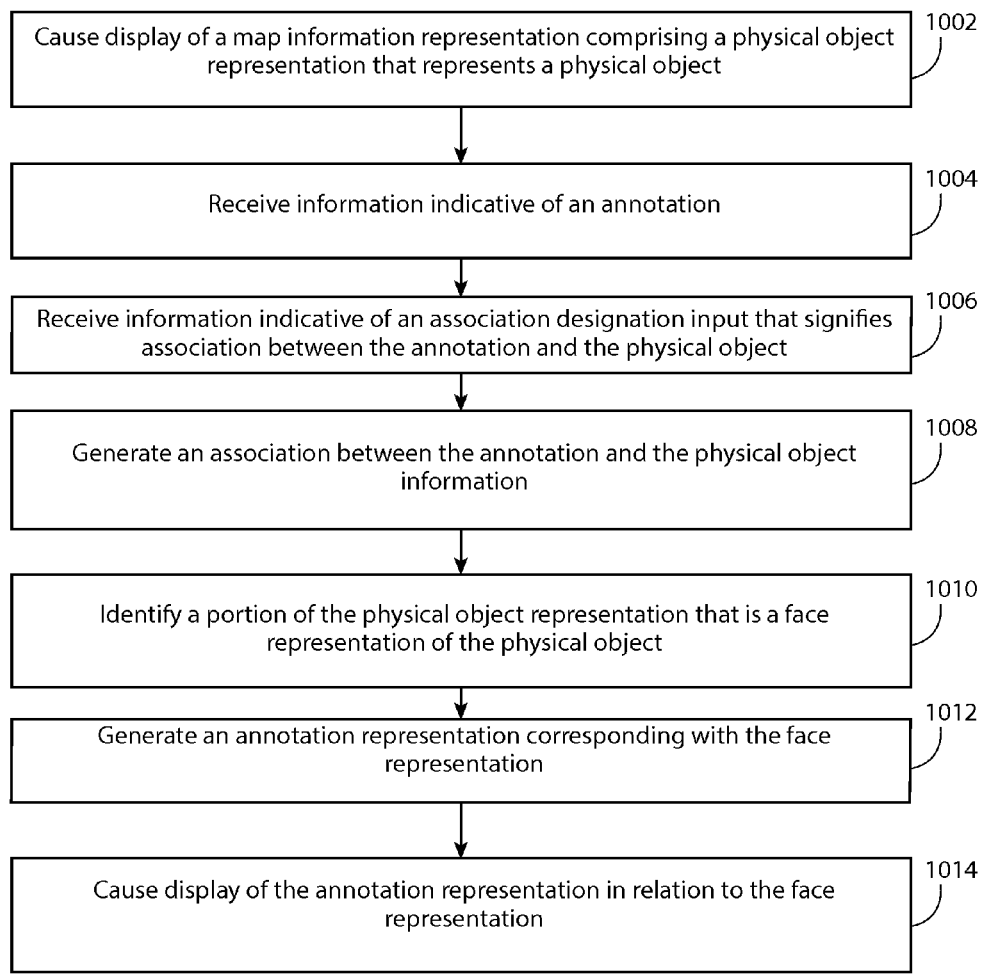
FIG. 10 is a flow diagram illustrating activities associated with generation of an association between an annotation and a physical object according to at least one example embodiment.

FIG. 10 is a flow diagram illustrating activities associated with generation of an association between an annotation and a physical object according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As previously described, in some circumstances an apparatus may associate an annotation with a physical object.

At block 1002, the apparatus causes display of a map information representation, similarly as described regarding block 902 of FIG. 9. At block 1004, the apparatus receives information indicative of an annotation, similarly as described regarding block 904 of FIG. 9.

At block 1006, the apparatus receives information indicative of an association designation input that signifies the association between the annotation and the physical object. The receipt and the association designation input may be similar as described regarding FIG. 1, FIGS. 2A-2C, FIGS. 3A-3C, FIGS. 4A-4E, FIGS. 5A-5D, FIGS. 6A-6B, FIGS. 7A-7F, and FIG. 8.

At block 1008, the apparatus generates an association between the physical object information and the annotation. The generation may be based, at least in part, on the information indicative of an association between the annotation and the physical object. The generation and the association may be similar as described regarding FIG. 1, FIGS. 2A-2C, FIGS. 3A-3C, FIGS. 4A-4E, FIGS. 5A-5D, FIGS. 6A-6B, FIGS. 7A-7F, and FIG. 8.

At block 1010, the apparatus identifies a portion of the physical object representation that is a face representation of the physical object, similarly as described regarding block 908 of FIG. 9. At block 1012, the apparatus generates an annotation representation that corresponds with the face representation, similarly as described regarding block 910 of FIG. 9. At block 1014, the apparatus causes display of the annotation representation in relation to the face representation, similarly as described regarding block 912 of FIG. 9.

Figure 11:
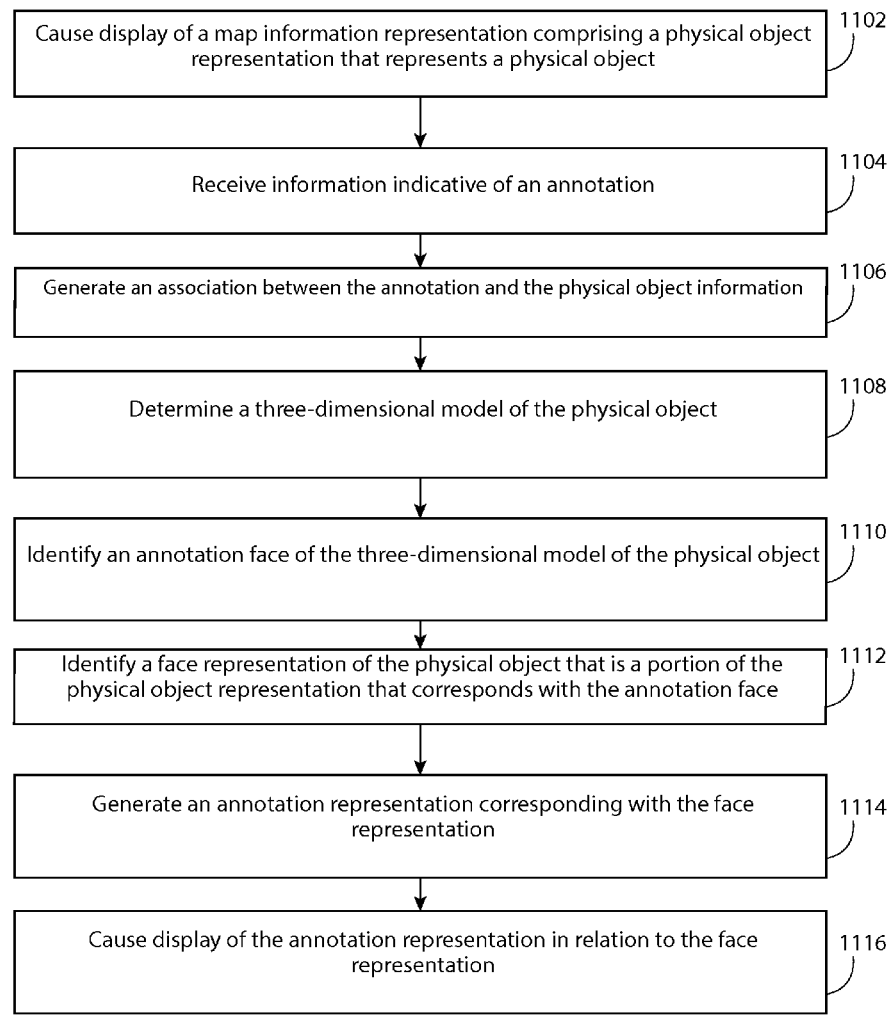
FIG. 11 is a flow diagram illustrating activities associated with identification of an annotation face according to at least one example embodiment.

FIG. 11 is a flow diagram illustrating activities associated with identification of an annotation face according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

As previously described, in some circumstances an apparatus may determine a face representation to utilize as an annotation face.

At block 1102, the apparatus causes display of a map information representation, similarly as described regarding block 902 of FIG. 9. At block 1104, the apparatus receives information indicative of an annotation, similarly as described regarding block 904 of FIG. 9. At block 1106, the apparatus generates an association between the physical object information and the annotation, similarly as described regarding block 906 of FIG. 9.

At block 1108, the apparatus determine a three-dimensional model of the physical object. The determination and the three-dimensional model may be similar as described regarding FIGS. 7A-7F.

At block 1110, the apparatus identifies an annotation face of the three-dimensional model of the physical object. The identification and the annotation face may be similar as described regarding FIGS. 7A-7F.

At block 1112, the apparatus identifies a face representation of the physical object that is a portion of the physical object representation that corresponds with the annotation face of the three-dimensional model. The identification and the face representation may be similar as described regarding FIGS. 7A-7F.

At block 1114, the apparatus generates an annotation representation that corresponds with the face representation, similarly as described regarding block 910 of FIG. 9. At block 1116, the apparatus causes display of the annotation representation in relation to the face representation, similarly as described regarding block 912 of FIG. 9.

Figure 12:
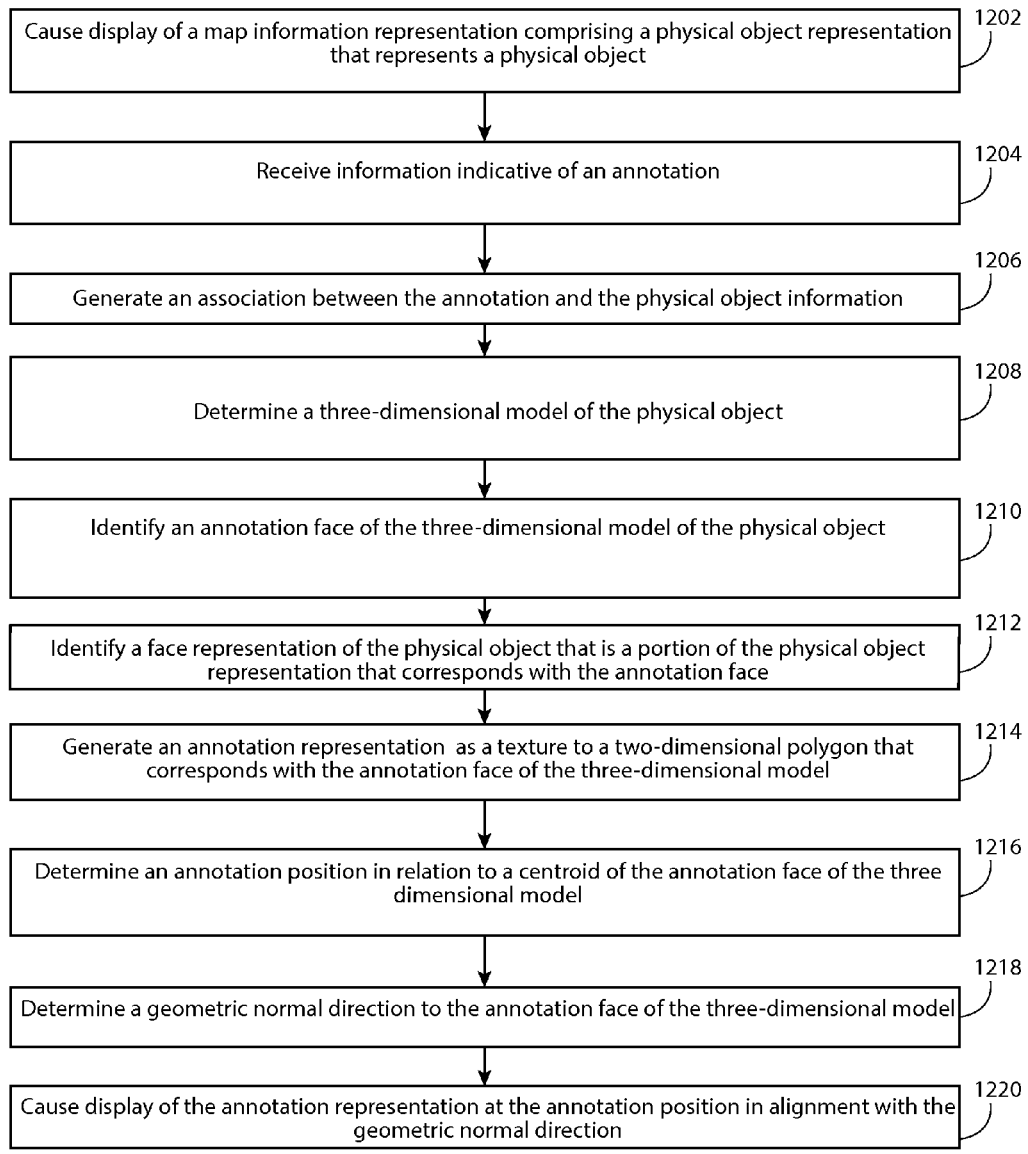
FIG. 12 is a flow diagram illustrating activities associated with display of an annotation representation in alignment with a geometric normal direction according to at least one example embodiment.

FIG. 12 is a flow diagram illustrating activities associated with display of an annotation representation in alignment with a geometric normal direction according to at least one example embodiment. In at least one example embodiment, there is a set of operations that corresponds with the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

As previously described, an apparatus may display an annotation representation in alignment with a geometric normal direction.

At block 1202, the apparatus causes display of a map information representation, similarly as described regarding block 902 of FIG. 9. At block 1204, the apparatus receives information indicative of an annotation, similarly as described regarding block 904 of FIG. 9. At block 1206, the apparatus generates an association between the physical object information and the annotation, similarly as described regarding block 906 of FIG. 9. At block 1208, the apparatus determine a three-dimensional model of the physical object, similarly as described regarding block 1108 of FIG. 11. At block 1210, the apparatus identifies an annotation face of the three-dimensional model of the physical object, similarly as described regarding block 1110 of FIG. 11. At block 1212, the apparatus identifies a face representation of the physical object that is a portion of the physical object representation that corresponds with the annotation face, similarly as described regarding block 1112 of FIG. 11.

At block 1214, the apparatus generates an annotation representation as a texture to a two-dimensional polygon that corresponds with the annotation face of the three-dimensional model. The generation, the annotation representation, the texture, and the two-dimensional polygon may be similar as described regarding FIGS. 3A-3C, FIGS. 4A-4E, FIGS. 6A-6B, and FIGS. 7A-7F.

At block 1216, the apparatus determines an annotation position in relation to a centroid of the annotation face of the three-dimensional model. The determination, the annotation position, and the centroid may be similar as described regarding FIGS. 3A-3C, FIGS. 4A-4E, FIGS. 6A-6B, and FIGS. 7A-7F.

At block 1218, the apparatus determines a geometric normal direction to the annotation face of the three-dimensional model. The geometric normal direction may be similar as described regarding FIGS. 7A-7F.

At block 1220, the apparatus causes display of the annotation representation at the annotation position in alignment with the geometric normal direction. The display and the alignment may be similar as described regarding FIG. 1, FIGS. 3A-3C, FIGS. 4A-4E, FIGS. 6A-6B, and FIGS. 7A-7F.

Figure 13:
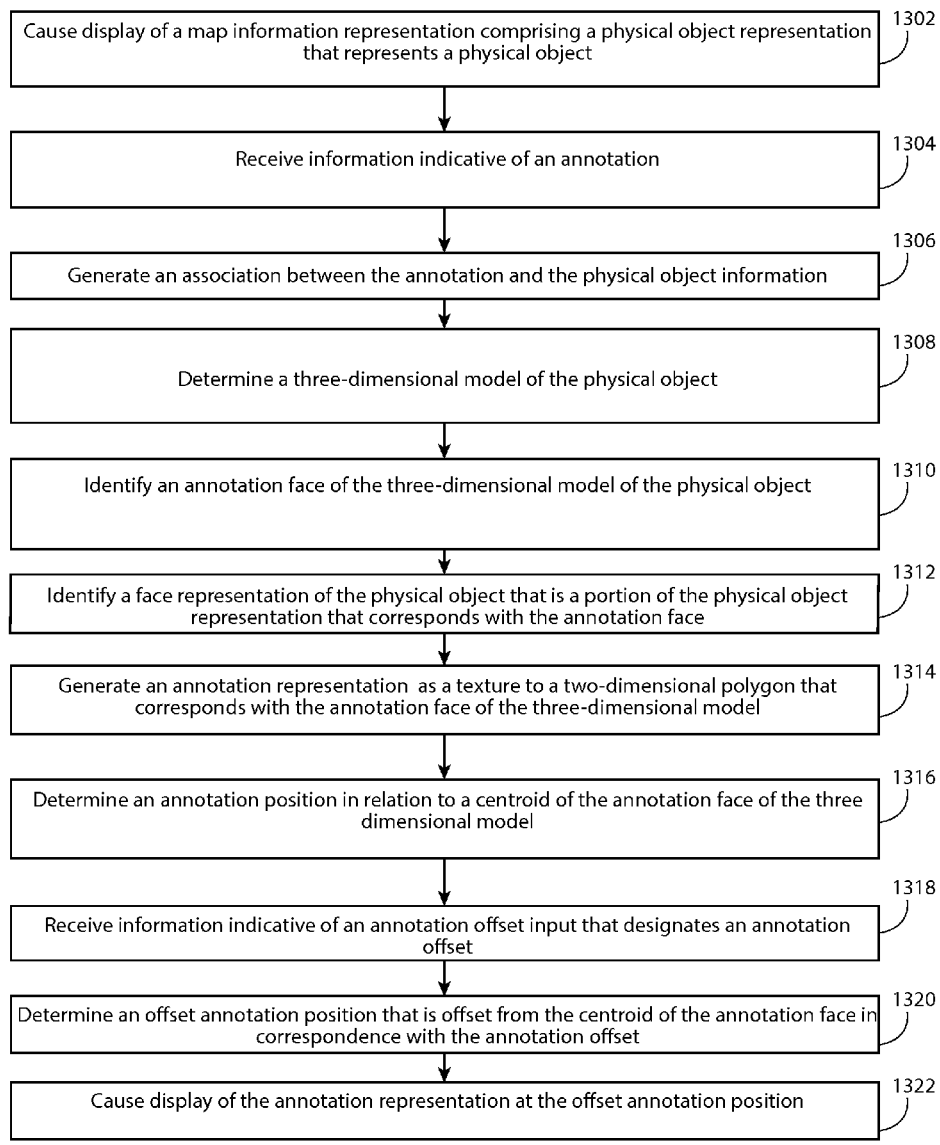
FIG. 13 is a flow diagram illustrating activities associated with determination of an annotation offset according to at least one example embodiment.

FIG. 13 is a flow diagram illustrating activities associated with determination of an annotation offset according to at least one example embodiment. In at least one example embodiment, there is a set of operations that corresponds with the activities of FIG. 13. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 13.

As previously described, in some circumstances an apparatus may determine an annotation offset.

At block 1302, the apparatus causes display of a map information representation, similarly as described regarding block 902 of FIG. 9. At block 1304, the apparatus receives information indicative of an annotation, similarly as described regarding block 904 of FIG. 9. At block 1306, the apparatus generates an association between the physical object information and the annotation, similarly as described regarding block 906 of FIG. 9. At block 1308, the apparatus determine a three-dimensional model of the physical object, similarly as described regarding block 1108 of FIG. 11. At block 1310, the apparatus identifies an annotation face of the three-dimensional model of the physical object, similarly as described regarding block 1110 of FIG. 11. At block 1312, the apparatus identifies a face representation of the physical object that is a portion of the physical object representation that corresponds with the annotation face, similarly as described regarding block 1112 of FIG. 11. At block 1314, the apparatus generates an annotation representation as a texture to a two-dimensional polygon that corresponds with the annotation face of the three-dimensional model, similarly as described regarding block 1214 of FIG. 12. At block 1316, the apparatus determines an annotation position in relation to a centroid of the annotation face of the three-dimensional model, similarly as described regarding block 1216 of FIG. 12.

At block 1318, the apparatus receives information indicative of an annotation offset input that designates an annotation offset. The receipt, the input, the designation, and the annotation offset may be similar as described regarding FIG. 1 and FIGS. 6A-6B.

At block 1320, the apparatus determines an offset annotation position that is offset from the centroid of the annotation face of the three-dimensional model in correspondence with the annotation offset. The determination and the offset annotation position may be similar as described regarding FIGS. 6A-6B.

At block 1322, the apparatus causes display of the annotation representation at the offset annotation position. The display may be similar as described regarding FIGS. 6A-6B.

Figure 14:
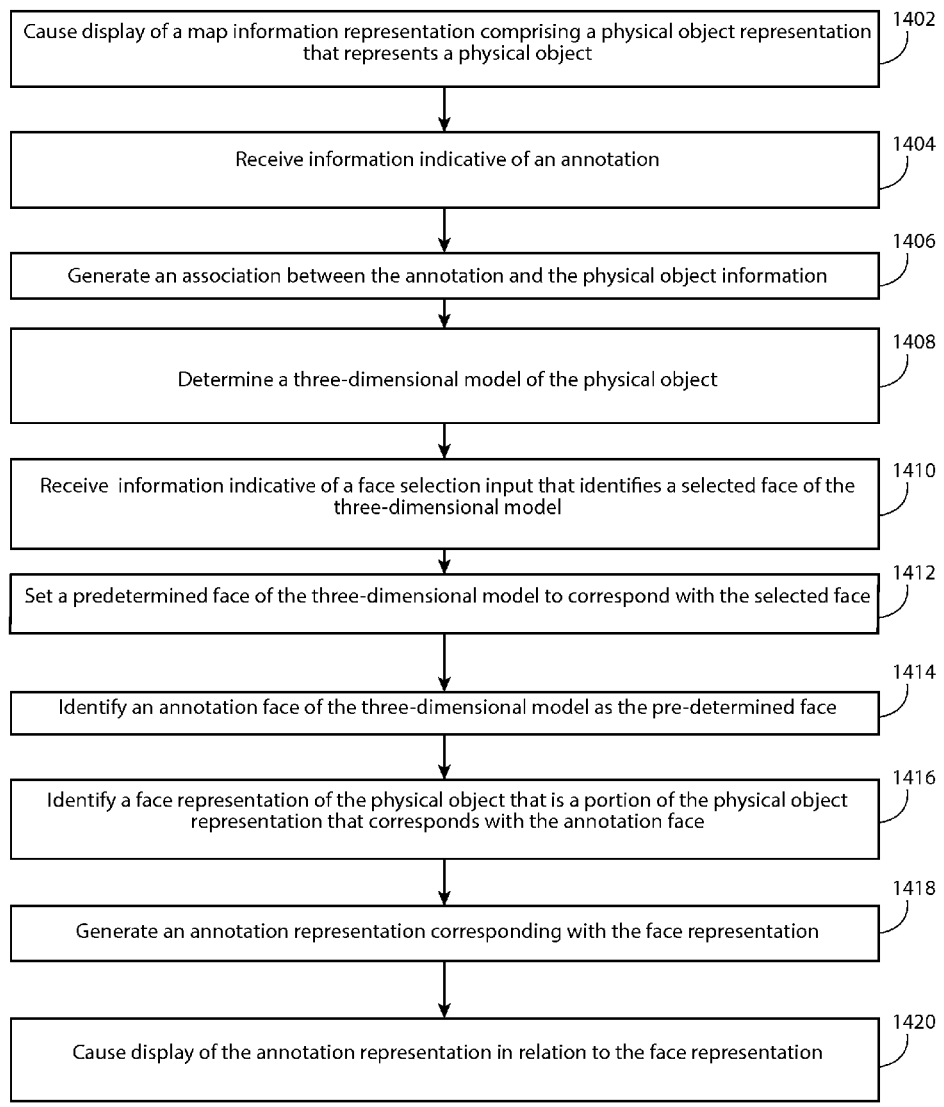
FIG. 14 is a flow diagram illustrating activities associated with identification of a selected face according to at least one example embodiment.

FIG. 14 is a flow diagram illustrating activities associated with identification of a selected face according to at least one example embodiment. In at least one example embodiment, there is a set of operations that corresponds with the activities of FIG. 14. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 14.

As previously described, in some circumstances an apparatus may identify a selected face of a physical object.

At block 1402, the apparatus causes display of a map information representation, similarly as described regarding block 902 of FIG. 9. At block 1404, the apparatus receives information indicative of an annotation, similarly as described regarding block 904 of FIG. 9. At block 1406, the apparatus generates an association between the physical object information and the annotation, similarly as described regarding block 906 of FIG. 9. At block 1408, the apparatus determine a three-dimensional model of the physical object, similarly as described regarding block 1108 of FIG. 11.

At block 1410, the apparatus receives information indicative of a face selection input that identifies a selected face of the three-dimensional model. The receipt, the input, and the selected face may be similar as described regarding FIGS. 7A-7F.

At block 1412, the apparatus sets a pre-determined face of the three-dimensional model to correspond with the selected face of the three-dimensional model. The setting and the pre-determined face may be similar as described regarding FIGS. 7A-7F.

At block 1414, the apparatus identifies an annotation face of the three-dimensional model as the pre-determined face. The identification and the annotation face may be similar as described regarding FIGS. 7A-7F.

At block 1416, the apparatus identifies face representation of the physical object that is a portion of the physical object representation that corresponds with the annotation face. The identification and the face representation may be similar as described regarding FIGS. 7A-7F.

At block 1418, the apparatus generates an annotation representation that corresponds with the face representation, similarly as described regarding block 910 of FIG. 9. At block 1420, the apparatus causes display of the annotation representation in relation to the face representation, similarly as described regarding block 912 of FIG. 9.

Figure 15:
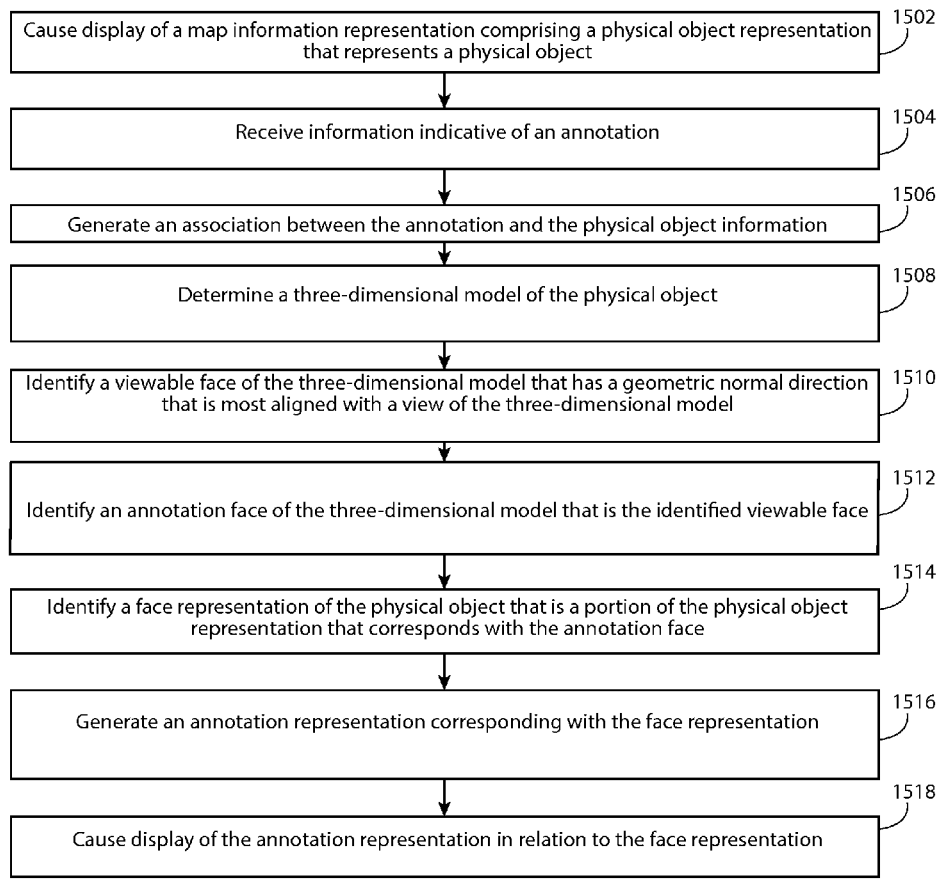
FIG. 15 is a flow diagram illustrating activities associated with identification of a viewable face according to at least one example embodiment.

FIG. 15 is a flow diagram illustrating activities associated with identification of a viewable face according to at least one example embodiment. In at least one example embodiment, there is a set of operations that corresponds with the activities of FIG. 15. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 15.

As previously described, in some circumstances an apparatus may identify a viewable face of a physical object.

At block 1502, the apparatus causes display of a map information representation, similarly as described regarding block 902 of FIG. 9. At block 1504, the apparatus receives information indicative of an annotation, similarly as described regarding block 904 of FIG. 9. At block 1506, the apparatus generates an association between the physical object information and the annotation, similarly as described regarding block 906 of FIG. 9. At block 1508, the apparatus determine a three-dimensional model of the physical object, similarly as described regarding block 1108 of FIG. 11.

At block 1510, the apparatus identifies an annotation face of the three-dimensional model that has a geometric normal direction that is most aligned with a view of the three-dimensional model. The identification, the annotation face, the geometric normal direction, the alignment, and the view may be similar as described regarding FIGS. 7A-7F.

At block 1512, the apparatus identifies an annotation face of the three-dimensional model that is the identified viewable face. The identification and the annotation face may be similar as described regarding FIGS. 7A-7F.

At block 1514, the apparatus identifies a face representation of the physical object that is a portion of the physical object representation that corresponds with the annotation face. The identification and the face representation may be similar as described regarding FIGS. 7A-7F.

At block 1516, the apparatus generates an annotation representation that corresponds with the face representation, similarly as described regarding block 910 of FIG. 9. At block 11518, the apparatus causes display of the annotation representation in relation to the face representation, similarly as described regarding block 912 of FIG. 9.

Figure 16:
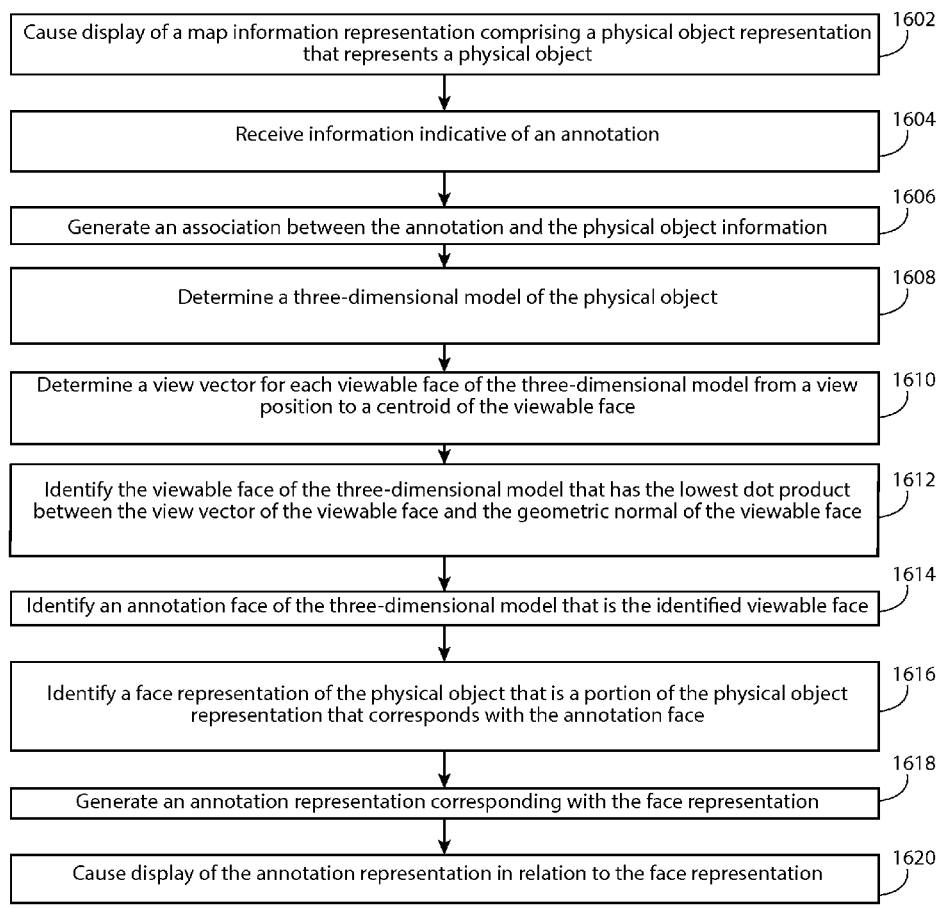
FIG. 16 is a flow diagram illustrating activities associated with determination of a view vector according to at least one example embodiment.

FIG. 16 is a flow diagram illustrating activities associated with determination of a view vector according to at least one example embodiment. In at least one example embodiment, there is a set of operations that corresponds with the activities of FIG. 16. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 16.

As previously described, in some circumstances an apparatus may determine a view vector.

At block 1602, the apparatus causes display of a map information representation, similarly as described regarding block 902 of FIG. 9. At block 1604, the apparatus receives information indicative of an annotation, similarly as described regarding block 904 of FIG. 9. At block 1606, the apparatus generates an association between the physical object information and the annotation, similarly as described regarding block 906 of FIG. 9. At block 1608, the apparatus determines a three-dimensional model of the physical object, similarly as described regarding block 1108 of FIG. 11.

At block 1610, the apparatus determine a view vector for each viewable face of the three-dimensional model from a view position to a centroid of the viewable face. The determination, the view vectors, the viewable faces, the view position, and the centroids may be similar as described regarding FIGS. 7A-7F.

At block 1612, the apparatus identifies the viewable face of the three-dimensional model that has the lowest dot product between the view vector of the viewable face and the geometric normal of the viewable face. The identification may be similar as described regarding FIGS. 7A-7F.

At block 1614, the apparatus identifies an annotation face of the three-dimensional model that is the identified viewable face. The identification and the annotation face may be similar as described regarding FIGS. 7A-7F.

At block 1616, the apparatus identifies a face representation of the physical object that is a portion of the physical object representation that corresponds with the annotation face. The identification and the face representation may be similar as described regarding FIGS. 7A-7F.

At block 1618, the apparatus generates an annotation representation that corresponds with the face representation, similarly as described regarding block 910 of FIG. 9. At block 1620, the apparatus causes display of the annotation representation in relation to the face representation, similarly as described regarding block 912 of FIG. 9.

Figure 17:
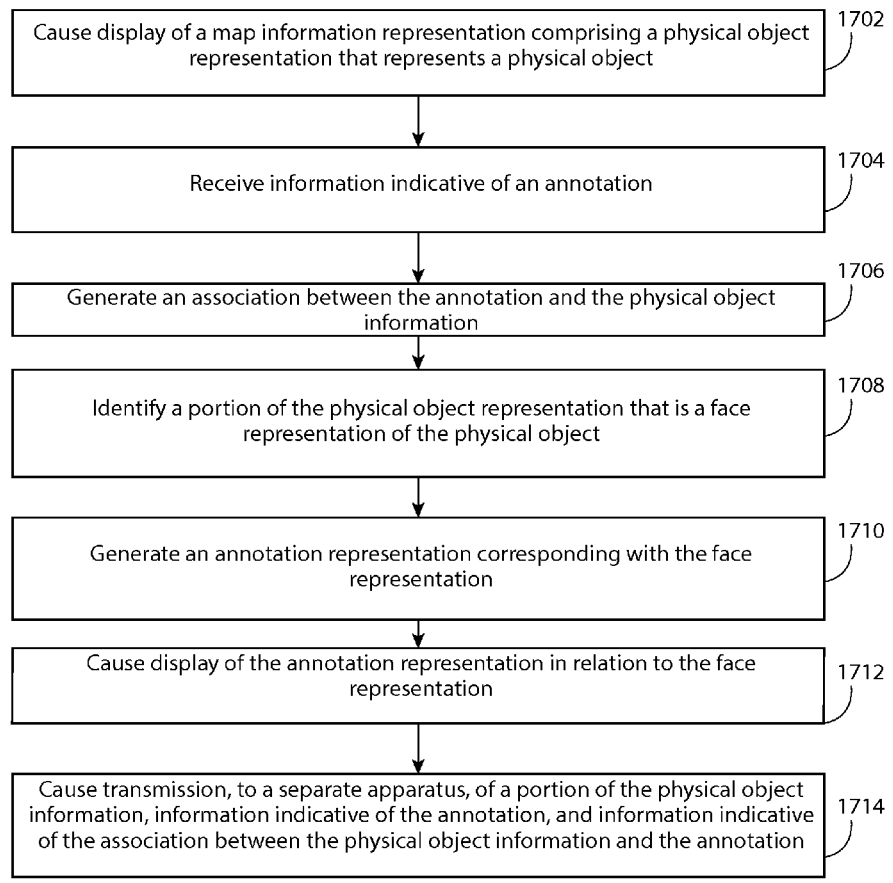
FIG. 17 is a flow diagram illustrating activities associated with transmission of physical object information according to at least one example embodiment.

FIG. 17 is a flow diagram illustrating activities associated with transmission of physical object information according to at least one example embodiment. In at least one example embodiment, there is a set of operations that corresponds with the activities of FIG. 17. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 17.

As previously described, in some circumstances an apparatus may transmit physical object information to a separate apparatus.

At block 1702, the apparatus causes display of a map information representation, similarly as described regarding block 902 of FIG. 9. At block 1704, the apparatus receives information indicative of an annotation, similarly as described regarding block 904 of FIG. 9. At block 1706, the apparatus generates an association between the physical object information and the annotation, similarly as described regarding block 906 of FIG. 9. At block 1708, the apparatus identifies a portion of the physical object representation that is a face representation of the physical object, similarly as described regarding block 908 of FIG. 9. At block 1710, the apparatus generates an annotation representation that corresponds with the face representation, similarly as described regarding block 910 of FIG. 9. At block 1712, the apparatus causes display of the annotation representation in relation to the face representation, similarly as described regarding block 912 of FIG. 9.

At block 1714, the apparatus causes transmission, to a separate apparatus, of at least a portion of the physical object information, information indicative of the annotation, and information indicative of the association between the physical object information and the annotation. The transmission the separate apparatus, the information indicative of the annotation, the information indicative of the association, may be similar as described regarding FIGS. 5A-5D and FIG. 8.

One or more example embodiments may be implemented in software, hardware, application logic or a combination of software, hardware, and application logic. The software, application logic, and/or hardware may reside on the apparatus, a separate device, or a plurality of separate devices. If desired, part of the software, application logic, and/or hardware may reside on the apparatus, part of the software, application logic and/or hardware may reside on a separate device, and part of the software, application logic, and/or hardware may reside on a plurality of separate devices. In an example embodiment, the application logic, software or an instruction set is maintained on any one of various computer-readable media.

If desired, the different functions discussed herein may be performed in a different order and/or concurrently with each other. For example, block 902 of FIG. 9 may be performed after block 904 of FIG. 9. Furthermore, if desired, one or more of the above-described functions may be optional or may be combined. For example, block 902 of FIG. 9 may be optional and/or combined with block 904 of FIG. 9.

Although various aspects of the present subject matter are set out in the independent claims, other aspects of the present subject matter comprise other combinations of features from the described example embodiments and/or the dependent claims with the features of the independent claims, and not solely the combinations explicitly set out in the claims.

It is also noted herein that while the above describes example embodiments, these descriptions should not be viewed in a limiting sense. Rather, there are variations and modifications which may be made without departing from the scope of the present subject matter.

What is claimed is:

1. An apparatus, comprising:
   at least one processor;
   at least one memory including computer program code, the memory and the computer program code configured to, working with the processor, cause the apparatus to perform at least the following:
   causation of display of a map information representation that represents map information, the map information comprising physical object information that characterizes a physical object, the map information representation comprising a physical object representation that represents the physical object;
   receipt of information indicative of an annotation;
   generation of an association between the physical object information and the annotation;
   determination of a three-dimensional model of the physical object;
   identification of an annotation face of the three-dimensional model of the physical object;
   identification of a portion of the physical object representation that is a face representation of the physical object based, at least in part, on the association between the physical object information and the annotation, wherein the portion of the physical object representation corresponds with the annotation face of the three-dimensional model of the physical object;
generation of an annotation representation that illustrates the annotation as a texture on a polygon, the polygon corresponding with the face representation;
receipt of information indicative of an annotation offset input that designates an annotation offset including a distance;
determination of an offset annotation position that is offset from the position of the annotation face of the three-dimensional model in correspondence with the annotation offset; and
causation of display of the annotation representation in relation to the face representation at the offset annotation position.

2. The apparatus of claim 1, wherein generation of the association between the physical object information and the annotation comprises:
receipt of information indicative of an association designation input that signifies the association between the annotation and the physical object; and
generation of the association between the physical object information and the annotation based, at least in part, on the information indicative of an association between the annotation and the physical object.

3. The apparatus of claim 1, wherein the annotation is a two-dimensional image and the generation of the annotation representation comprises applying the two-dimensional image as a texture to a two-dimensional polygon that corresponds with the annotation face of the three-dimensional model.

4. The apparatus of claim 3, wherein causation of display of the annotation representation comprises:
determination of an annotation position in relation to a position of the annotation face of the three-dimensional model; and
causation of display of the annotation representation at the annotation position.

5. The apparatus of claim 1, wherein the memory includes computer program code configured to, working with the processor, cause the apparatus to perform:
determination of an annotation position in relation to a position of the face representation;
receipt of information indicative of a view change input that designates a change from a view of the map information represented by the map information representation to a different view of at least part of the map information;
causation of display of a different map information representation, the different map information representation being representative of the different view of the map information, the different map information representation comprising a different physical object representation that represents the physical object; and
causation of display of the annotation representation at the annotation position in relation to the different physical object representation.

6. The apparatus of claim 1, wherein the memory includes computer program code configured to, working with the processor, cause the apparatus to perform causation of transmission, to a separate apparatus, of at least a portion of the physical object information, information indicative of the annotation, information indicative of the association between the physical object information and the annotation.

7. The apparatus of claim 6, wherein the memory includes computer program code configured to, working with the processor, cause the apparatus to perform receipt of information indicative an annotation share input, wherein the causation of transmission is performed in response to the annotation share input.

8. A method comprising:
causing display of a map information representation that represents map information, the map information comprising physical object information that characterizes a physical object, the map information representation comprising a physical object representation that represents the physical object;
receiving information indicative of an annotation;
generating an association between the physical object information and the annotation;
determining a three-dimensional model of the physical object;
identifying an annotation face of the three-dimensional model of the physical object;
identifying a face representation of the physical object to be a portion of the physical object representation that corresponds with the annotation face of the three-dimensional model of the physical object, wherein the face representation is identified
based, at least in part, on the association between the physical object information and the annotation;
rotating the annotation to align with a normal vector for a polygon corresponding with the annotation face of the three-dimensional model;
generating an annotation representation that illustrates the annotation as a texture on the polygon corresponding with the face representation; and
causing display of the annotation representation in relation to the face representation.

9. The method of claim 8, wherein generation of the association between the physical object information and the annotation comprises:
receiving information indicative of an association designation input that signifies the association between the annotation and the physical object; and
generating the association between the physical object information and the annotation based, at least in part, on the information indicative of an association between the annotation and the physical object.

10. The method of claim 8, wherein the annotation is a two-dimensional image and the generation of the annotation representation comprises applying the two-dimensional image as a texture to a two-dimensional polygon that corresponds with the annotation face of the three-dimensional model.

11. The method of claim 10, wherein causation of display of the annotation representation comprises:
determining an annotation position in relation to a position of the annotation face of the three-dimensional model; and
causing display of the annotation representation at the annotation position.

12. The method of claim 11, further comprising:
receiving information indicative of an annotation offset input that designates an annotation offset;
determining an offset annotation position that is offset from the position of the annotation face of the three-dimensional model in correspondence with the annotation offset; and
causing display of the annotation representation at the offset annotation position.

13. The method of claim 8, further comprising receiving information indicative an object selection input that identifies the physical object representation, wherein the generation of the association between the physical object information and the annotation is performed in response to the object selection input.

14. At least one non-transitory computer-readable medium encoded with instructions that, when executed by a processor, perform:
- causation of display of a map information representation that represents map information, the map information comprising physical object information that characterizes a physical object, the map information representation comprising a physical object representation that represents the physical object;
- receipt of information indicative of an annotation;
- generation of an association between a centroid of an outward wall of the physical object information and the annotation;
- determination of a three-dimensional model of the physical object;
- identification of an annotation face of the three-dimensional model of the physical object;
- identification of the face representation of the physical object to be a portion of the physical object representation;
- identification of the outward wall of the physical object representation that is a face representation of the physical object that corresponds with the annotation face of the three-dimensional model of the physical object, wherein the identification is based, at least in part, on the association between the centroid of the outward wall of the physical object information and the annotation;
- determination of an offset annotation position that is offset from the annotation face of the three-dimensional model in correspondence with an annotation offset;
- generation of an annotation representation that illustrates the annotation as a texture on a polygon, the polygon corresponding with the face representation; and
- causation of display of the annotation representation in relation to the face representation according to the annotation offset.

15. The medium of claim 14, wherein generation of the association between the physical object information and the annotation comprises:
- receipt of information indicative of an association designation input that signifies the association between the annotation and the physical object; and
- generation of the association between the physical object information and the annotation based, at least in part, on the information indicative of an association between the annotation and the physical object.

16. The medium of claim 14, wherein the annotation is a two-dimensional image and the generation of the annotation representation comprises applying the two-dimensional image as a texture to a two-dimensional polygon that corresponds with the annotation face of the three-dimensional model.

* * * * *